Sept. 1, 1953 J. G. WEISINGER 2,650,757
TAXIMETER
Filed Aug. 30, 1947 14 Sheets-Sheet 1
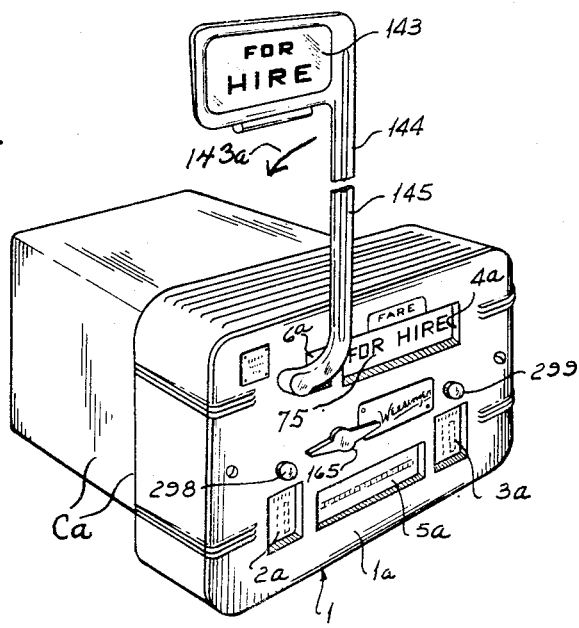
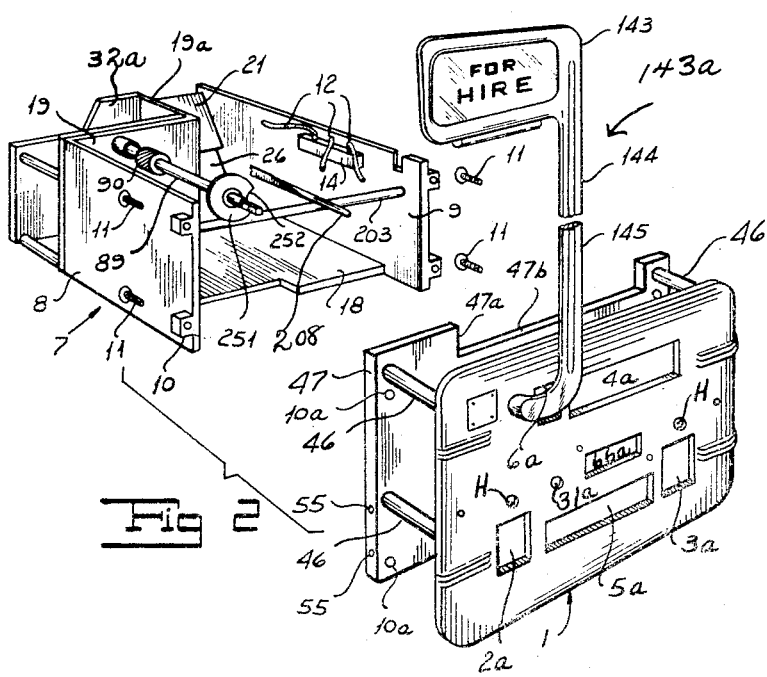
INVENTOR.
Joseph George Weisinger
BY Mock & Blum
ATTORNEYS Sept. 1, 1953 J. G. WEISINGER 2,650,757
TAXIMETER
Filed Aug. 30, 1947 14 Sheets-Sheet 2
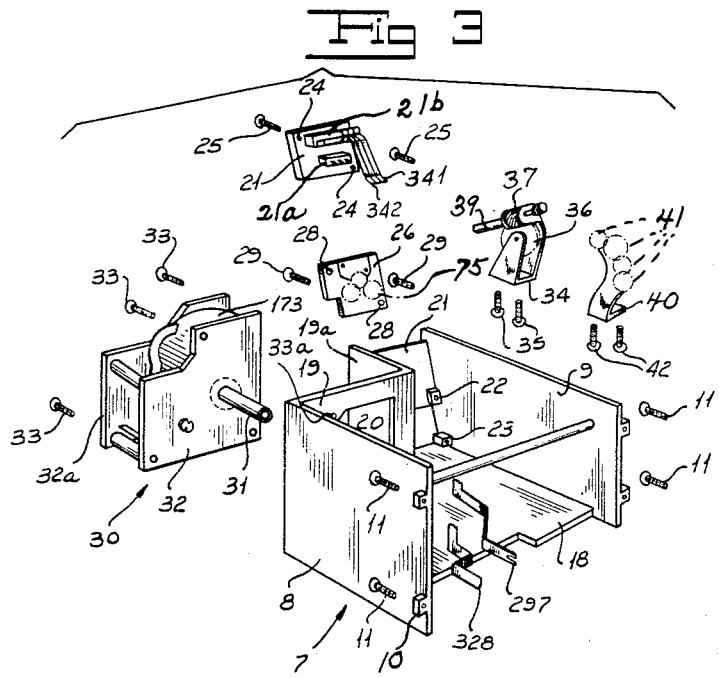
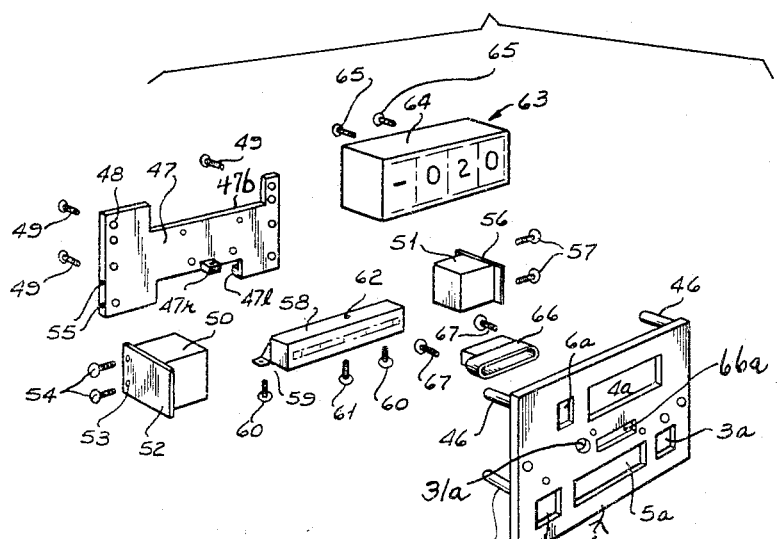
INVENTOR.
Joseph George Weisinger
BY Mock & Blum
ATTORNEYS

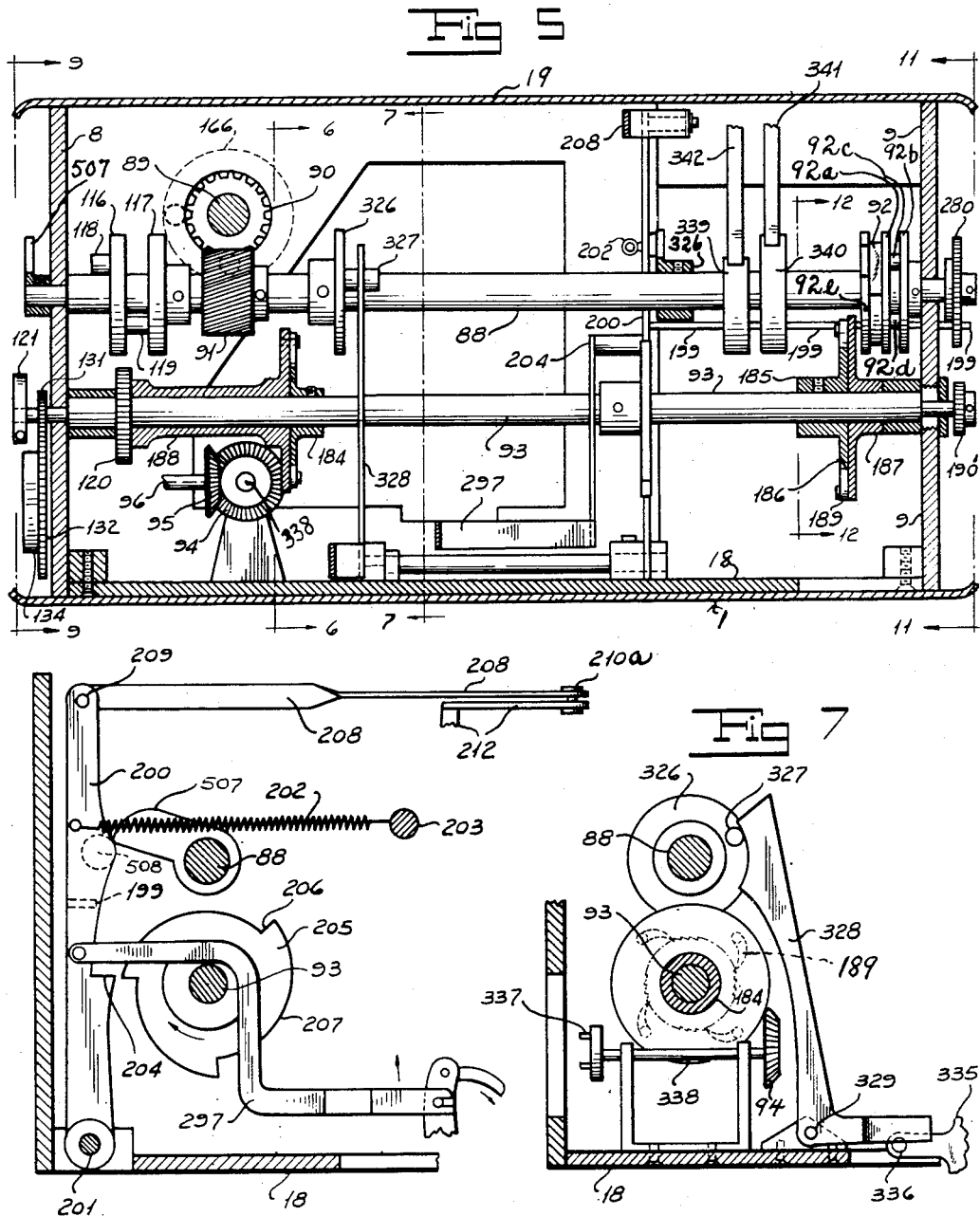

Sept. 1, 1953 J. G. WEISINGER 2,650,757
TAXIMETER
Filed Aug. 30, 1947 14 Sheets-Sheet 4

INVENTOR.
Joseph George Weisinger
BY
Mock-Blum
ATTORNEYS

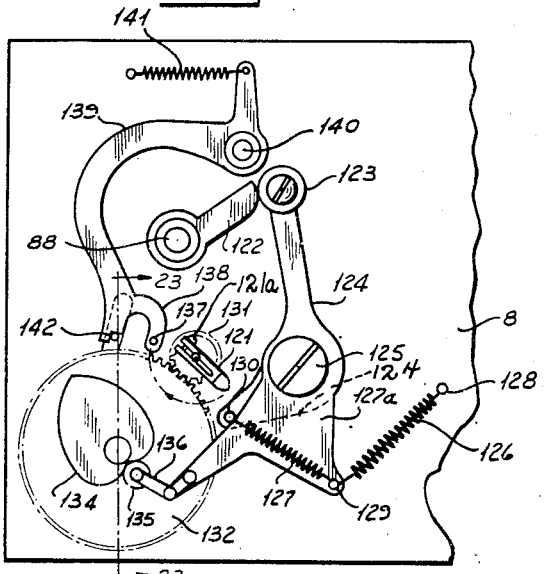
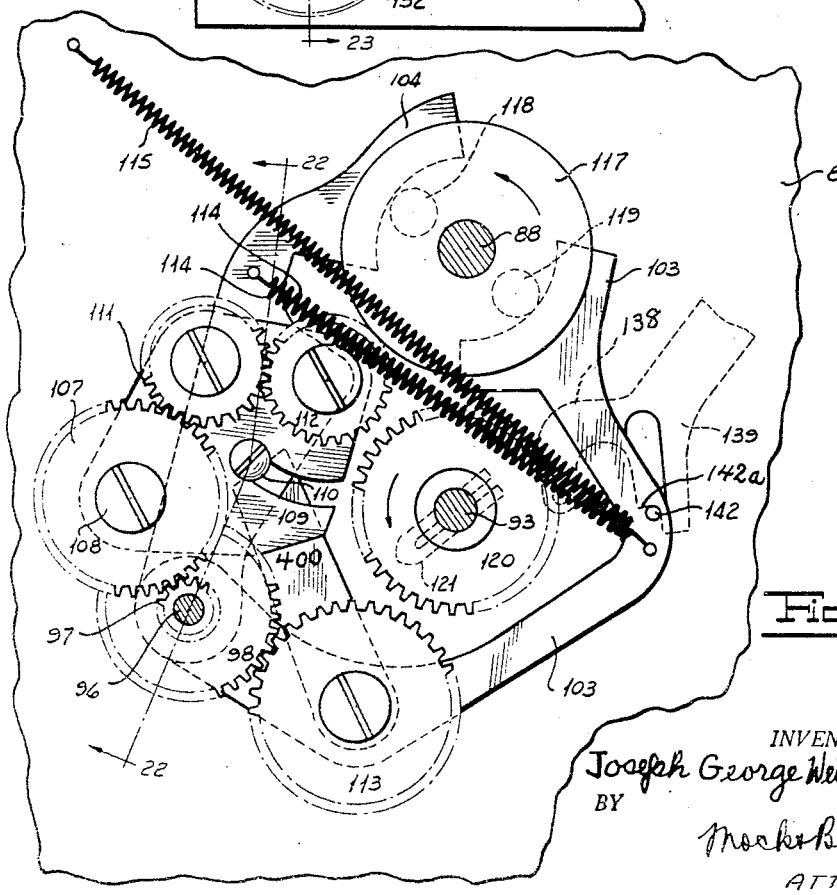

Sept. 1, 1953 J. G. WEISINGER 2,650,757
TAXIMETER
Filed Aug. 30, 1947 14 Sheets-Sheet 6

INVENTOR.
Joseph George Weisinger
BY Mock & Blum
ATTORNEYS

Sept. 1, 1953  J. G. WEISINGER  2,650,757
TAXIMETER
Filed Aug. 30, 1947  14 Sheets-Sheet 7
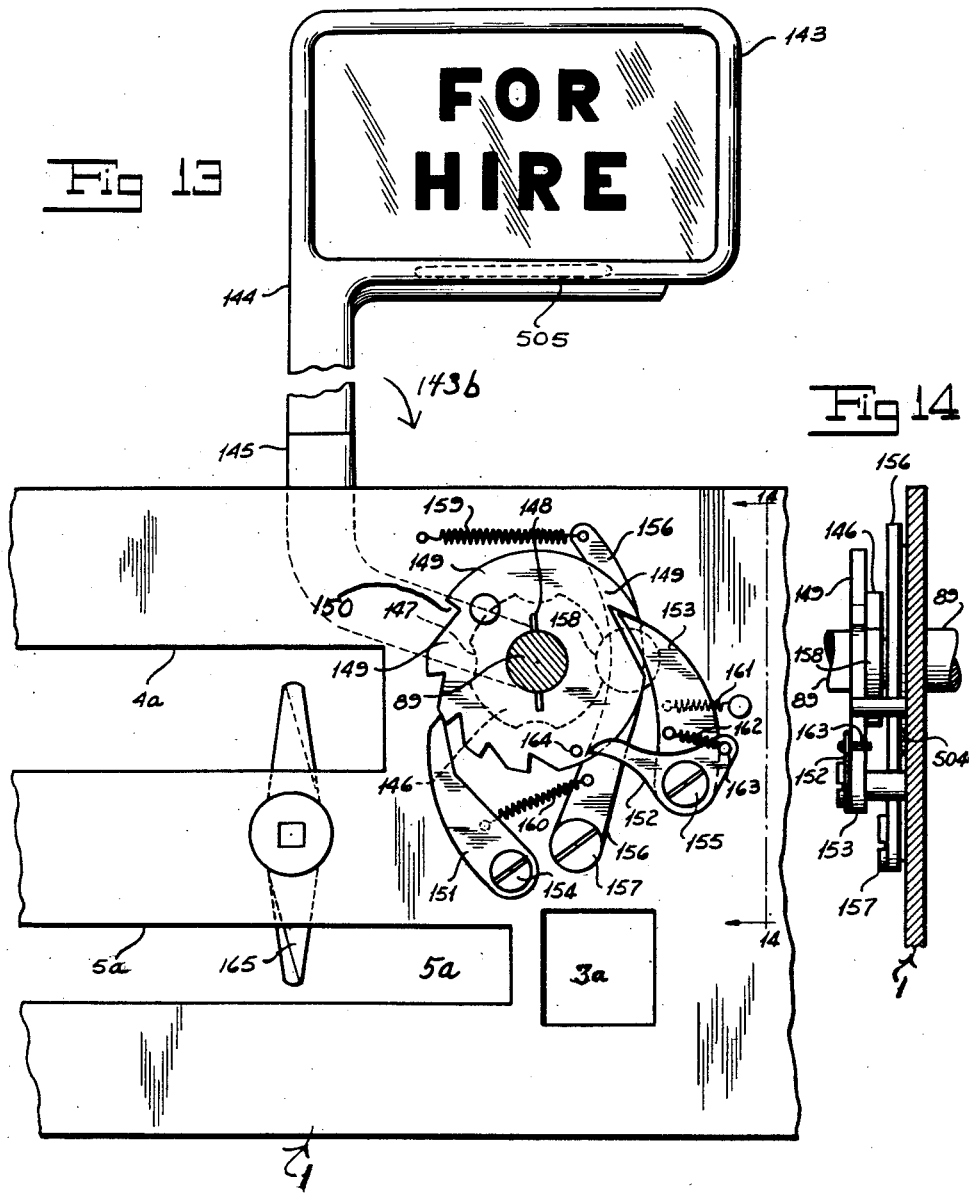
INVENTOR.
Joseph George Weisinger
BY
Mocha Blum
ATTORNEYS

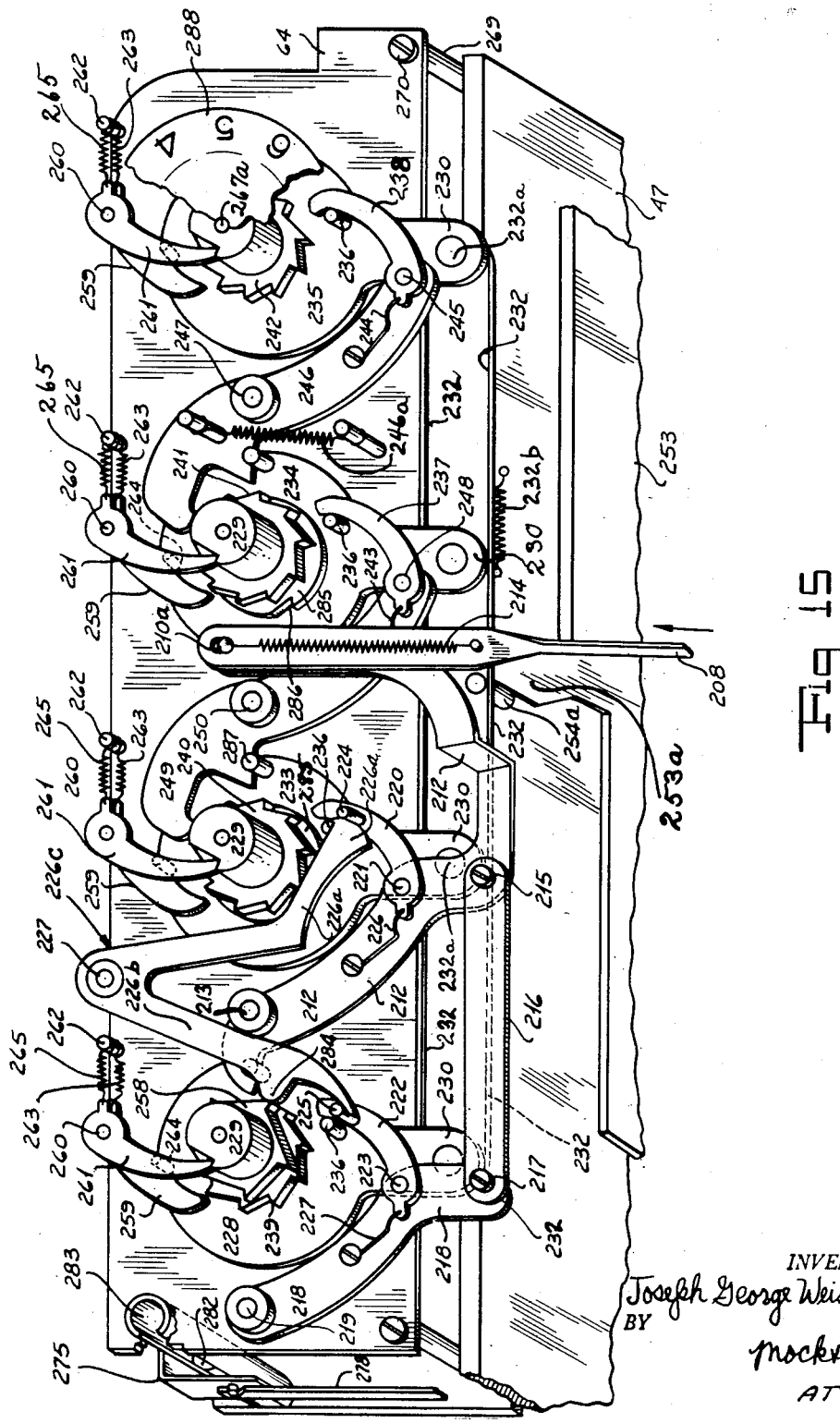

Sept. 1, 1953  J. G. WEISINGER  2,650,757
TAXIMETER
Filed Aug. 30, 1947  14 Sheets-Sheet 9
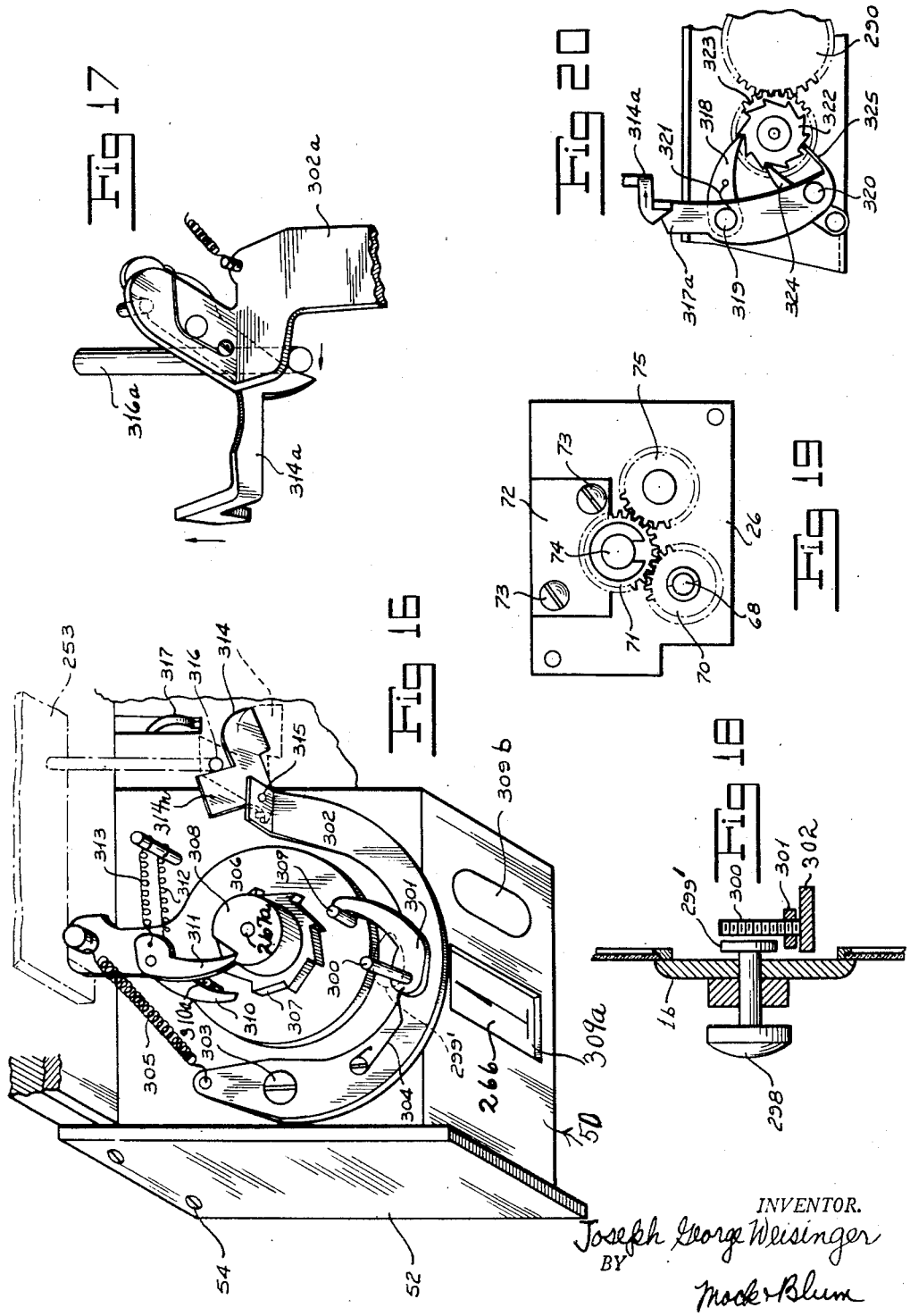
INVENTOR.
Joseph George Weisinger
BY
Mock & Blum
ATTORNEYS

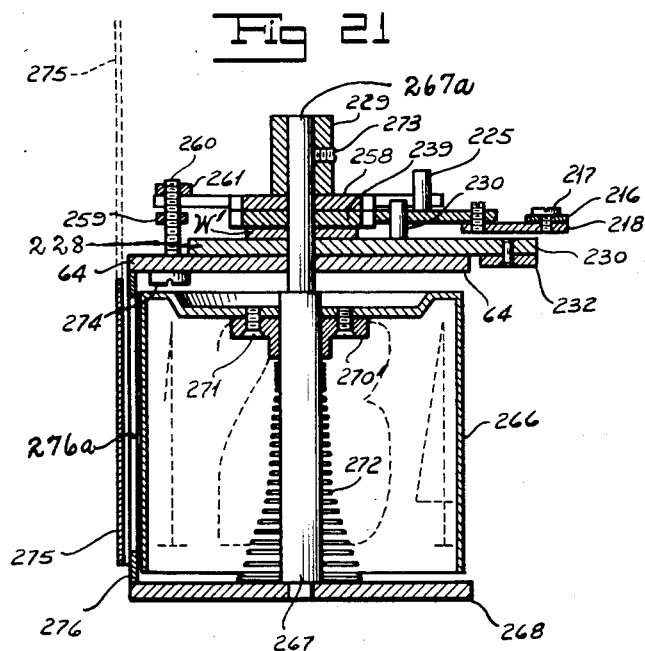
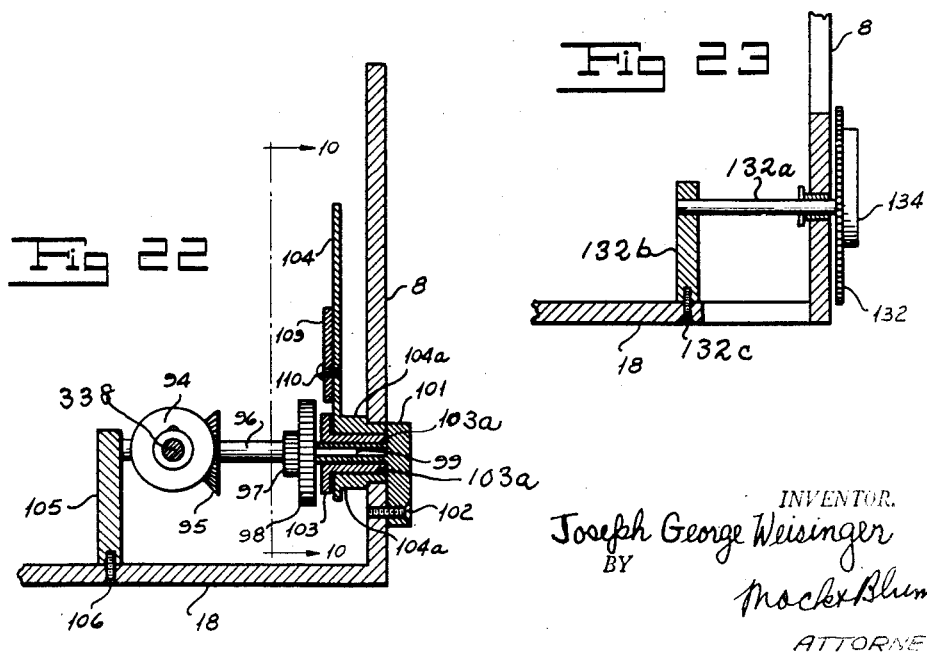

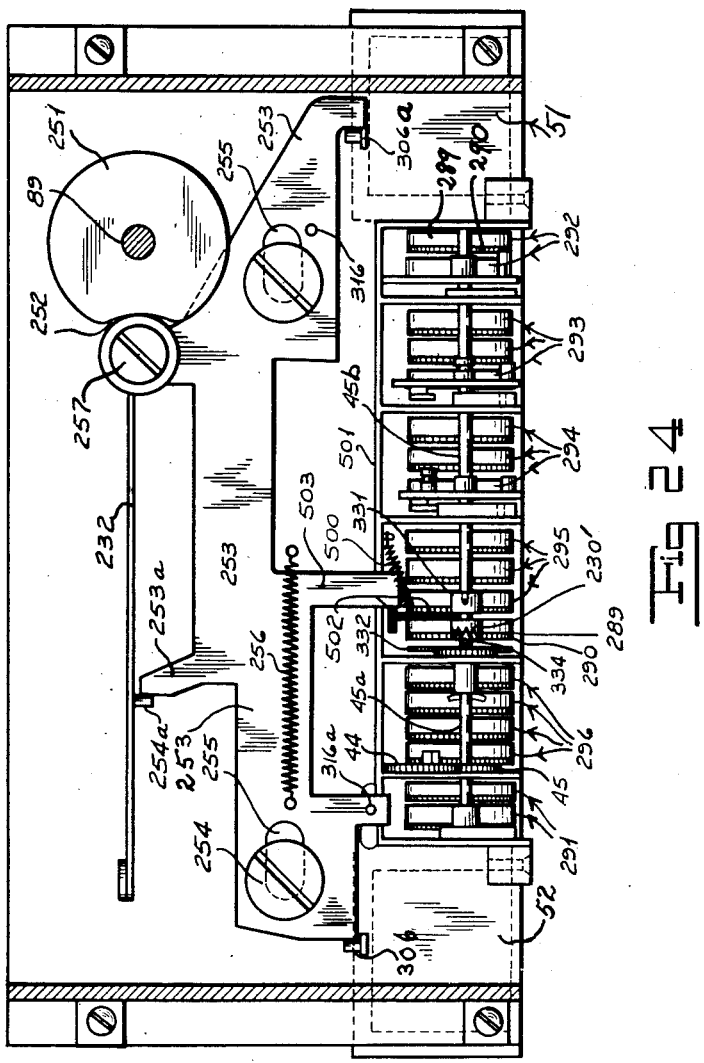

Sept. 1, 1953 J. G. WEISINGER 2,650,757
TAXIMETER
Filed Aug. 30, 1947 14 Sheets-Sheet 12
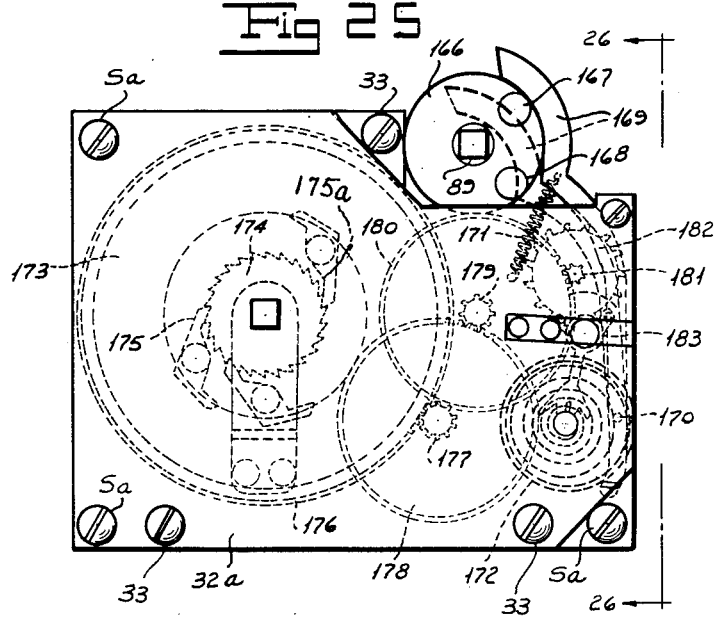
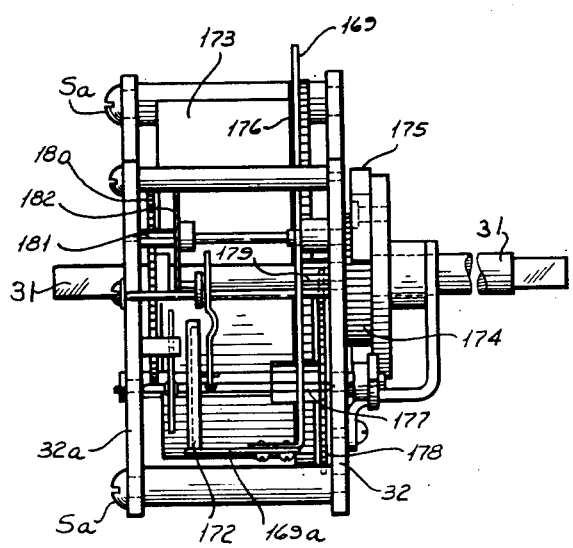
INVENTOR.
Joseph George Weisinger
BY Mock & Blum
ATTORNEYS Sept. 1, 1953 J. G. WEISINGER 2,650,757
TAXIMETER
Filed Aug. 30, 1947 14 Sheets-Sheet 13
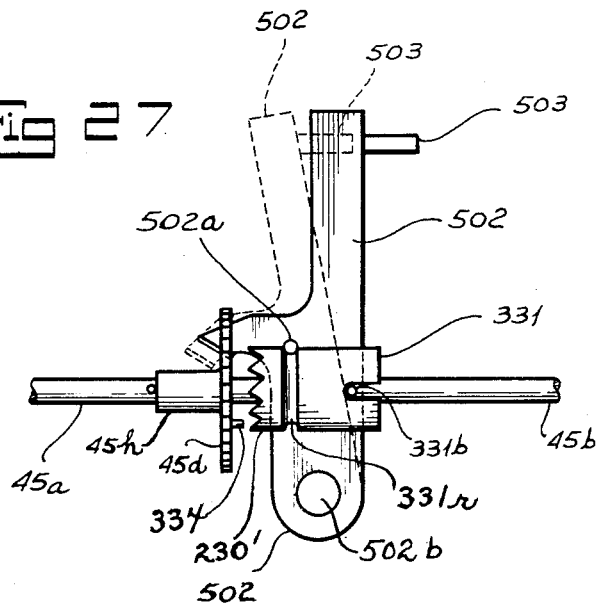
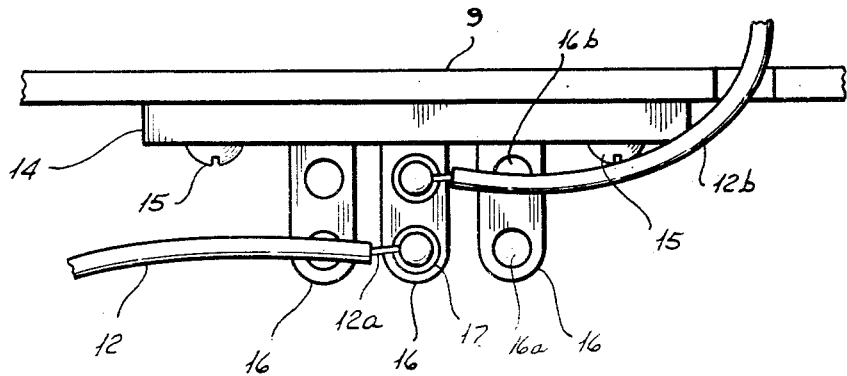
INVENTOR.
Joseph George Weisinger
BY
Mock & Blum
ATTORNEYS Sept. 1, 1953 J. G. WEISINGER 2,650,757
TAXIMETER
Filed Aug. 30, 1947 14 Sheets-Sheet 14
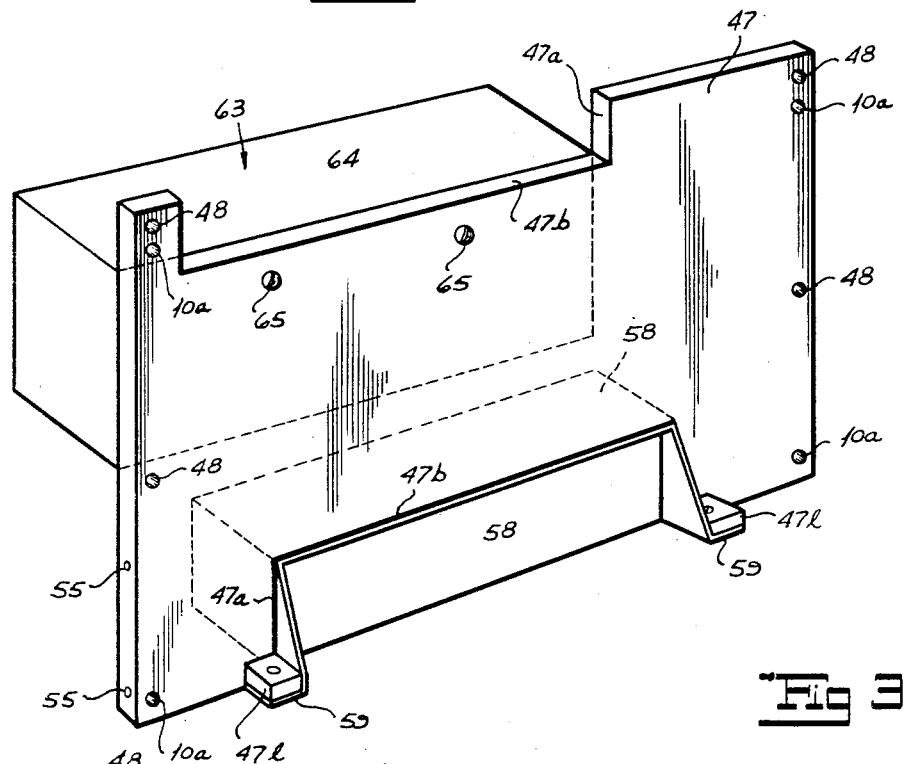
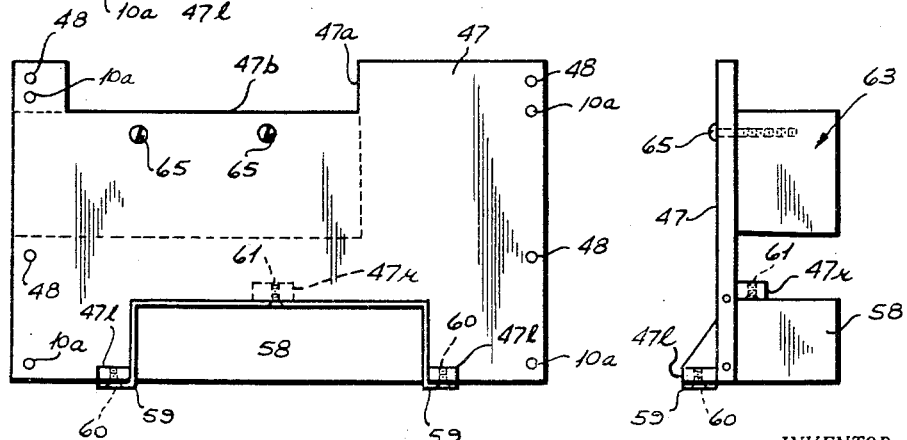
INVENTOR.
Joseph George Weisinger
BY
Mock & Blum
ATTORNEYS Patented Sept. 1, 1953

2,650,757

UNITED STATES PATENT OFFICE 2,650,757

TAXIMETER

Joseph George Weisinger, Newark, N. J.

Application August 30, 1947, Serial No. 771,451

10 Claims. (Cl. 235—30)

My invention relates to a new and improved taximeter.

One of the objects of my invention is to provide a small and compact taximeter.

Another object of my invention is to provide a taximeter which can be easily assembled and disassembled, in order to facilitate its manufacture, inspection and repair.

In particular, I provide a taximeter which comprises several assemblies in respective sub-casings or sub-housings, each of which can be removed without disturbing the other parts. Hence, if a respective assembly in a respective sub-casing becomes defective, it can be very easily removed and replaced. This applies particularly to the registering or indicating parts of the taximeter. This is a very important and novel feature. As hitherto made, if many important parts of a taximeter became defective, it was necessary wholly or substantially to disassemble the taximeter, in order to secure access to the defective part. This expensive and lengthy work is eliminated according to my invention.

When the cab is "For Hire" the flag of the taximeter is in the "up" position, in the embodiment illustrated herein.

In certain localities, a normal rate of fare is authorized during certain hours, and a higher rate of fare, such as double fare, is authorized during other hours. I provide a taximeter whereby the normal rate of fare is registered when the flag has been turned in a selected direction from its "up" position to a first selected "down" position, and the extra rate of fare is registered when the flag has been turned further in said selected direction to a second "down" selected position.

A cab may be forced temporarily to stop during a paid trip, in order to replace a tire or for some other reason. I provide a device whereby, in such case, the flag may be further turned in said selected direction to a third selected "down" position, designated as "free waiting time," during which no fare is registered if the cab is not in motion. When the cab is ready to proceed, the flag is turned from said third selected position to the first or to the second selected "down" position, in a direction reverse to said selected direction.

In this embodiment, the flag is fixed to a turnable flag-shaft. Said first, second, and third "down" positions correspond respectively to angles of rotation of said flag-shaft of 90°, 180°, and 270° from said "up" position. The flag-shaft can be turned in said single selected direction from said "up" position to each of said three selected "down" positions.

In addition, the flag may be turned from any of the three "down" positions to any other of said "down" positions, by turning the flag shaft either clockwise or counterclockwise, within the aforesaid angular range of 90°–270°.

I also provide a device by which the flag can be returned to its "up" position, by turning it in said single selected direction from any respective "down" position, so that reverse turning of the flag-shaft is unnecessary.

I also provide an additional hand-operated register or registers for registering one or more extra charges, such as extra charges for luggage, also an extra charge for an additional passenger, etc., together with control means whereby such additional register or registers cannot be hand operated while the flag is in its "up" position.

I also provide improved means for displaying the successive units of fare during a paying trip.

These units of fare are displayed to the passenger, during a paying trip, by means of respective drums, which display or exhibit the respective successive digits or numerals of the respective fare. Each drum exhibits a respective set of digits or numerals. At the end of a trip, these drums are returned to respective initial display positions against suitable stops by respective return torsion springs, which are wound during the trip. I provide an improved slip connection between said drums and their respective torsion springs, at one or more of said drums, so as to prevent overwinding the respective torsion spring or springs.

It is well-known to automatically drive these display drums and also to drive the register of paid fares, by means of a mechanical connection with a wheel or shaft of the cab, and also by a supplemental clock mechanism. This clock mechanism actuates the respective automatic display and register parts during a paid trip while the cab is waiting, or while the cab is moving at less than a selected speed. It is also well-known in many localities to display and to register an initial minimum fare for a selected initial zone or distance at the beginning of a paid trip, and to automatically increase the display and register of said minimum initial fare by successive additional fare units during the paid trip, after the cab has travelled this selected initial distance or zone. I provide improved means whereby the taximeter can be adjusted to register the first additional fare unit when the cab has travelled less than the selected initial distance or zone, in order to allow for waiting time or to allow for slow speed. I also provide improved means for regulating the length of this initial zone.

Numerous additional important objects, features and advantages of my invention are disclosed in the annexed description and drawings, which illustrate a preferred embodiment thereof.

Fig. 1 is a perspective exterior view of the complete assembled device, in which the flag is shown in its "up" position. This illustrates a conventional removable casing Ca, which is detachably secured to the front plate 1.

Fig. 2 is a perspective view, omitting the representation of casing Ca, which shows the partition plate 47 of the frame of the device fixed to said front plate 1, and which also shows the rear part of the frame of the device and certain associated parts. This rear part of the frame is shown as detached from the partition plate.

Fig. 3 is a perspective view of the rear part of the frame of the device, together with certain associated parts, including some associated parts which are not shown in Fig. 2. These parts are shown separated from each other.

Fig. 4 is a perspective view which shows the front plate, the partition plate, the sub-casings or sub-housings for various sub-assemblies, and the lamp socket.

Fig. 5 is a transverse sectional view, partially in elevation, of the rear part of the frame and of certain working parts, looking towards the rear of the device.

Figs. 6 and 7 are respectively longitudinal sectional views on the lines 6—6 and 7—7 of Fig. 5.

Figure 8:
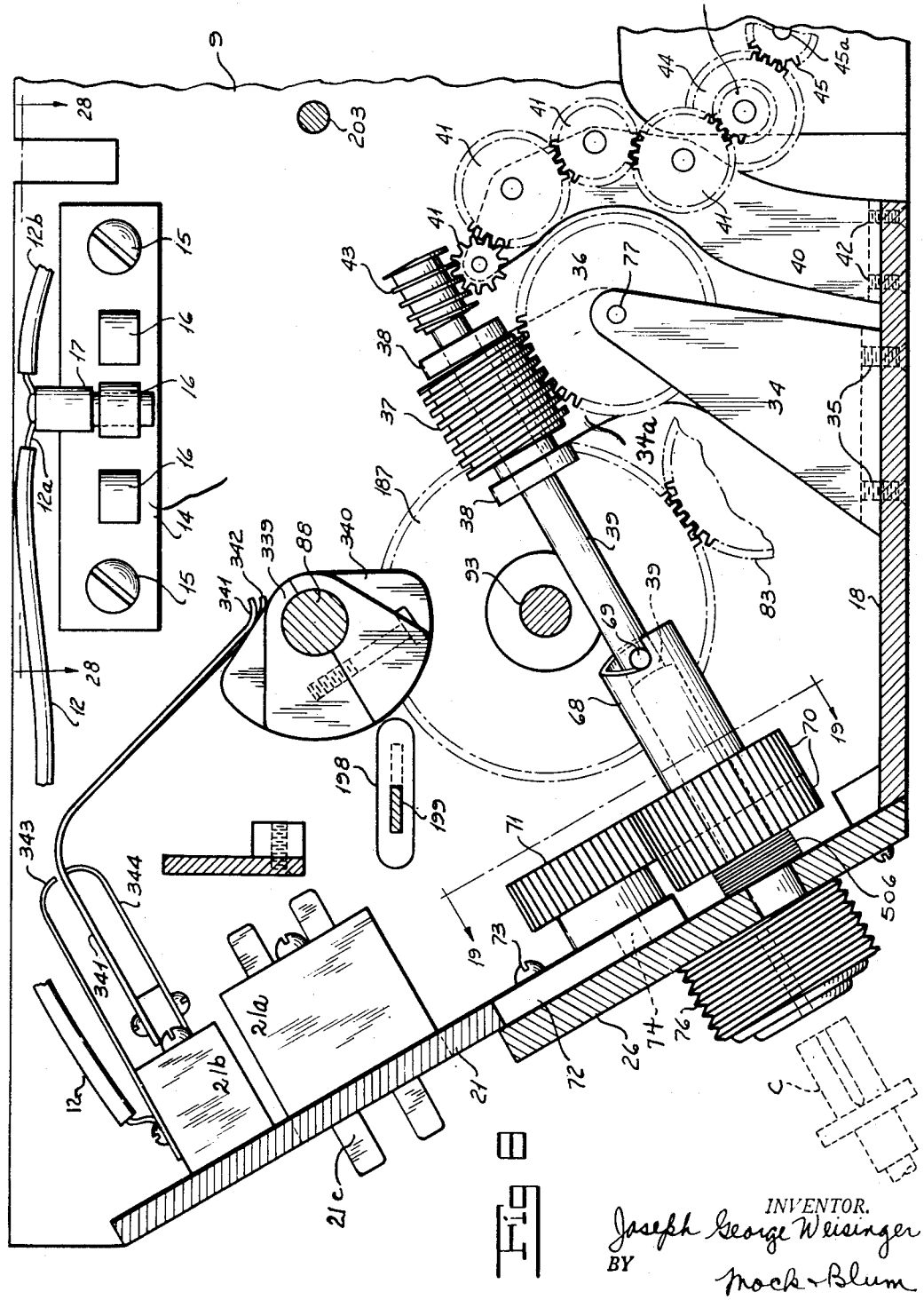

Fig. 8 is a detail longitudinal sectional view, partially in elevation, showing the wheel drive for operating certain parts, together with certain auxiliary other parts.

Fig. 9 is an elevation on the line 9—9 of Fig. 5.

Fig. 10 is a sectional view, partially in elevation, on the line 10—10 of Fig. 22. Fig 10 is drawn to a larger scale than Fig. 9.

Figure 11:
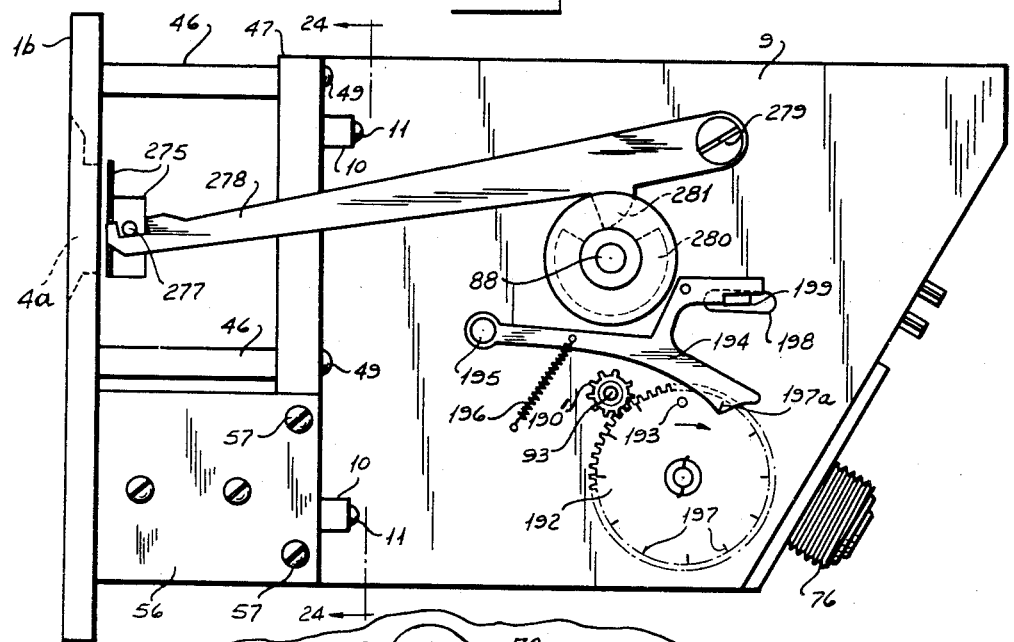

Fig. 11 is an elevation on the line 11—11 of Fig. 5.

Figure 12:
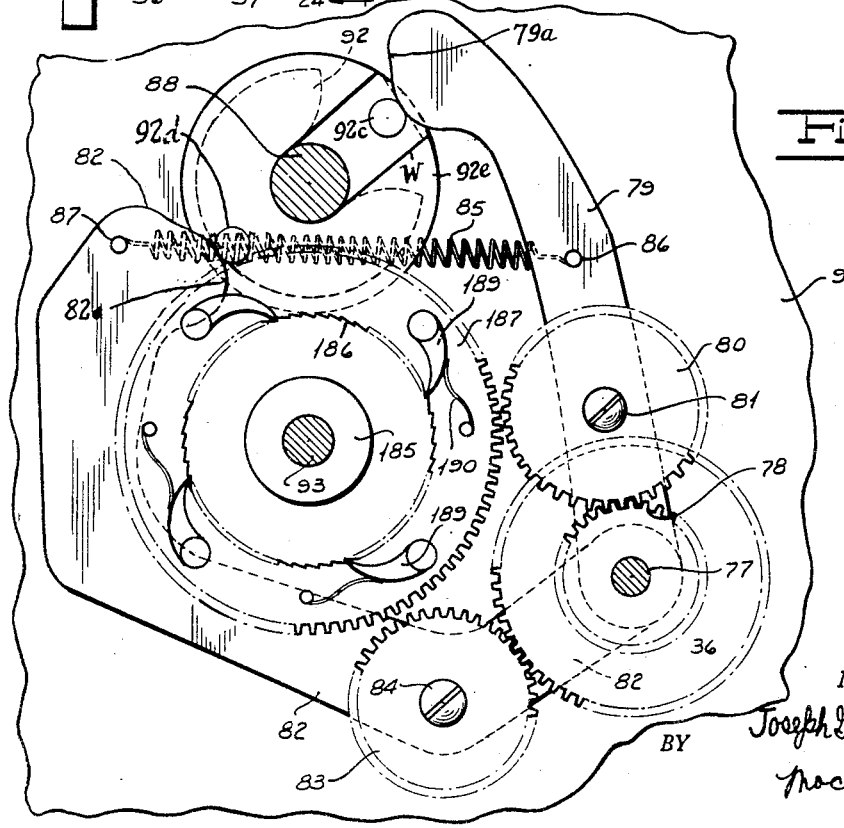

Fig. 12 is a section, partially in elevation, on the line 12—12 of Fig. 5.

Fig. 13 is a detail rear view, which illustrates the mechanism whereby the flag can be releasably held in any of the selected "down" positions.

Fig. 14 is a sectional view on the line 14—14 of Fig. 13.

Fig. 15 is a detail top view which shows the mechanism for registering and exhibiting to the driver and the passenger, the charge for a respective ordinary trip without any extras.

Fig. 16 illustrates one of the devices for registering and displaying a respective extra charge.

Fig. 17 is a view of a part of another device for registering and displaying another respective extra charge.

Fig. 18 is a detail section, partially in elevation, showing the means for operating the mechanism for registering and displaying the extra charge which is registered and displayed by the mechanism of Fig. 16.

Fig. 19 is a sectional view on the line 19—19 of Fig. 8.

Fig. 20 is a detail view which shows the means for operating the registering and displaying discs which are associated with the extra fare charges.

Fig. 21 is a detail section which illustrates one of the several drums whereby a respective fare unit is registered by the mechanism of Fig. 15, together with certain accessory parts.

Fig. 22 is a sectional view on the line 22—22 of Fig. 10.

Fig. 23 is a sectional view on the line 23—23 of Fig. 9.

Fig. 24 is a sectional view on the line 24—24 of Fig. 11.

Fig. 25 is a detail view of the clock mechanism of the device, as viewed from the rear end of the device.

Fig. 26 is a view on the line 26—26 of Fig. 25.

Fig. 27 is a detail view of the clutch mechanism of Fig. 24.

Fig. 28 is a top view on the line 28—28 of Fig. 8.

Fig. 29 is a detail perspective view of the partition plate, showing two of the sub-casings detachably fixed thereto.

Fig. 30 is a front elevation of Fig. 29, on a smaller scale.

Fig. 31 is a side elevation of Fig. 30.

*Frame of device, sub-casings of device, and the wheel drive for parts which display and record the fare*

As shown in Fig. 2, the frame of the device comprises a transverse front plate 1, which has a front wall 1a. This plate 1 has respective openings or windows 6a, 4a, 66a, 2a, 5a, and 3a. The main or exterior casing Ca which is shown in Fig. 1, is detachably fixed to front plate 1 in any suitable manner, so as to enclose the internal parts of the device, save that the flag shaft 89 projects forwardly from the front and rear of the device and the winding shaft for the spring of the clock-mechanism may also thus project, and the hand-operated buttons for the hand-operated registers extend forwardly.

As shown in Figs. 2 and 4, said front plate 1 is provided with four rear, longitudinal and parallel posts or studs 46, which are arranged in two pairs.

Fig. 29 shows that the partition plate 47 has four longitudinal holes 48. Each post 46 is longitudinally aligned with a respective hole 48. The rear ends of posts 46 are provided with respective longitudinal and tapped recesses. Fig. 4 shows screws 49. I use four screws 49, whose shanks extend through holes 48, in order detachably to connect partition plate 47 to the rear ends of studs 46.

Figs. 4 and 29 show that partition plate 47 has top and bottom recesses. Each said recess has two vertical walls 47a, and a horizontal wall 47b. At its bottom, partition plate 47 has two longitudinal and rearward lugs 47l. As shown in Fig. 4 and Fig. 31, the bottom wall 47b is provided at its middle with a forward longitudinal lug 47r.

Fig. 4 shows a sub-casing 50, which contains the hand-operated mechanism for displaying and registering a respective extra charge, such as an extra passenger charge; a sub-casing 51 which contains the hand-operated mechanism for displaying and registering another respective extra charge, such as a charge for luggage; a sub-casing 58, which contains the mechanism for displaying and registering, as viewed from left to right at the front of window 5a, an extra passenger charge at station 292 of Fig. 24; the number of times the flag is turned down, at station 293; the successive fare units at station 294, each fare unit corresponding to a respective complete rocking movement of arm 299, later described;

the total paid distance traveled at station 295; the total distance traveled at station 296; and the extra luggage charge, at station 291.

The sub-casing 63 contains the drums for displaying the fare for paid distance, at window 4a.

These sub-casings are shown only diagrammatically in Fig. 4.

The sub-casings 50 and 51 are respectively aligned with the openings or windows 2a and 3a.

As shown in Fig. 15, the sub-casing 63 has a top plate 64, which is connected to a corresponding bottom plate, by vertical posts 269 and screws 270.

Fig. 2 also shows that plate 1 has two longitudinal holes H and another longitudinal hole 31a.

The longitudinal shanks of hand-operated buttons 298 and 299 extend forwardly through respective holes H. As later described, the button 298 operates the register for displaying and recording the extra passenger charge. The button 299 operates the register for recording a charge for extra luggage. This embodiment has a spring operated clock, which has a longitudinal winding shaft 31. Fig. 1 shows a winding knob 155 which is attached to a short winding sleeve which can be inserted through opening 31a, in order to engage the front end of winding shaft 31, in order to wind said shaft 31. The rear of the taximeter is provided with a hole similar to 31a, so that said winding sleeve can be rearwardly inserted in order to wind the clock spring.

As shown in Fig. 4 and Fig. 29, the sub-casing 58 has two lateral end-lugs 59, and a hole 62 in its top wall. Fig. 31 shows that the sub-casing lugs 59 abut lugs 47l of partition plate 47. The top wall of sub-casing 58 abuts lug 47r of partition plate 47. The lugs 47l and 59 are releasably fixed to each other by respective vertical screws 60. The lug 47r is optionally fixed releasably to to the top wall of sub-casing 58 by a vertical screw 61, which can be upwardly removed.

As also shown in Fig. 29 and Fig. 31, the rear transverse wall of sub-casing 63 is releasably fixed to partition plate 47 by two longitudinal screws 65.

As shown in Fig. 4, the sub-casings 50 and 51 have respective longitudinal plates 52 and 56, which are identical. Plate 52 has lateral holes 53. Screws 54 extend through holes 53 and engage tapped lateral recesses 55, shown in Fig. 29, which are provided at one vertical edge-wall of partition plate 47. The longitudinal plate 56 of sub-casing 51 is similarly detachably fixed to the other edge-wall of partition plate 47.

Each of the sub-casings 63, 50, 51 and 58 can thus be attached to and detached from partition plate 47, independently of the other said sub-casings, and while partition plate 47 remains fixed to front plate 1 and to the rear frame-part of the device. Hence, if any sub-assembly of any sub-casing becomes defective, said sub-casing can be easily removed and replaced. These sub-casings 63, 50, 51 and 58 are located between the partition plate 47 and plate 1.

Fig. 4 also shows a lamp-socket 66, which is detachably fixed to partition plate 47 by screws 67, so that the lamp in said socket is aligned with opening or window 66a. Fig. 1 shows a transparent plate which bears a trade-mark and which is fixed to plate 1 at the opening or window 66a.

Fig. 2 shows a rear frame 7, which is located rearwardly of partition plate 47. This rear frame 7 has parallel vertical and longitudinal walls 8 and 9 which are connected by a lateral brace rod 203, and a bottom longitudinal and horizontal wall 18. At their front ends, said vertical longitudinal walls 8 and 9 are provided with lateral lugs 10, which have horizontal and longitudinal tapped bores or recesses. Fig. 29 shows that partition plate 47 has longitudinal bores 10a, which are longitudinally aligned with the tapped longitudinal bores or recesses of lugs 10. The lugs 10 are detachably fixed to partition plate 47 by screws 11. These lugs 10 abut the rear face of partition plate 47.

The longitudinal wall 8 is shorter than wall 9. At its rear edge, wall 8 is integral with a lateral vertical wall 19. As shown in Fig. 3, said wall 19 has an opening 20. When it is desired to turn the winding shaft 31 of the spring clock at the rear of the taximeter, the winding sleeve is inserted through opening 20. Said lateral wall 19 has a rearward longitudinal and vertical extension 19a.

Fig. 3 shows a sub-casing 30, in which the clock-mechanism is located. Said sub-casing 30 has a front vertical and lateral wall 32, which is parallel to a rear wall 32a of said sub-casing 30. This front wall or plate 32 is detachably fixed by screws 33 to wall 19, with longitudinal winding shaft 31 aligned with the holes 20 and 31a. This winding shaft 31 extends through a hole, not shown, in partition plate 47.

Fig. 3 shows a rearwardly inclined lateral plate 21, and bosses 22 and 23 of wall 9. The wall 19a has similar bosses, which are not shown. Plate 21 is fixed detachably to the two bosses 22 of walls 9 and 19a, by screws 25, which pass through respective holes 24 of plate 21.

As shown in Fig. 3, and in greater detail in Fig. 8, a series of circuit switches are connected to a plate or block 21b, made of insulating material, which is fixed detachably to plate 21. These circuit switches are later more fully described. An electric socket attachment 21a, which has plug blades 21c, is also detachably fixed to plate 21. This socket attachment 21a is for the lamp, not shown, which is held in lamp-socket 66.

Fig. 3 and Fig. 8 show a lower, rearwardly inclined plate 26, which has tapped bores 28. The lower plate 26 is fixed detachably to bosses 23 of walls 9 and 19a by screws 29.

As shown in detail in Fig. 19 and diagrammatically in Fig. 3, gears 70 and 75 are turnably mounted on lower plate 26. As also shown in detail in Figs. 8 and 19, a plate 72 is adjustably fixed to lower plate 26 by clamping screws 73. This plate 72 has conventional adjustment slots which are vertically disposed in Fig. 19. The shanks of said clamping screws 73 extend through said adjustment slots, and engage the internal threads of respective tapped bores of plate 26.

As shown in Fig. 8, a shaft 74 has a bearing in plate 72. Gear 71 has a slotted hub, by means of which gear 71 can be detachably fixed to shaft 74.

Fig. 8 shows a sleeve 68 which is fixed to gear 70. Fig. 19 shows that gear 71 meshes with gears 70 and 75. In order to select the respective relative angular velocities of sleeve 68 and gear 75, I select gears 70 and 75 of the desired relative size, and I adjust plate 72 so that gear 71 will mesh with the selected gears 70 and 75.

Fig. 8 shows the conventional end-coupling C of a flexible shaft which is rotated by an axle of the taxicab. This coupling C is inserted through a boss 76 of plate 26, to engage and to rotate the shaft of gear 75, thus rotating sleeve 68 by means of gears 71 and 70.

As shown in Fig. 8, the rear part of a shaft 39 fits in sleeve 68. This sleeve 68 has two shoulders, only one of which is shown, which abut two diametrically opposed pins 69 of shaft 39, only one pin being shown. The shaft 39 is thus rotated in unison with sleeve 68.

Respective hollow worms 37 and 43 are detachably fixed to shaft 39. By mounting these two worms 37 and 43 on a single shaft 39, I provide a compact device.

Worm 37 meshes with a worm-gear 36, which is mounted turnably, as also shown in Fig. 3, between the legs of a U-shaped mount 34. As shown in Fig. 8, the bottom wall of U-shaped mount 34 is detachably fixed to bottom wall 18 by screws 35. Worm-gear 36 is fixed to shaft 77.

The worm 43 meshes with the top gear of a train of gears 41. As shown in Figs. 3 and 8, the four gears 41 are rotatably mounted on an angular mount 40, whose base is fixed detachably to bottom wall 18 by screws 42.

As shown in Fig. 8, the bottom gear 41 meshes with a gear 44a, which is fixed to a gear 44, which meshes with a gear 45, which is fixed to shaft 45a.

Fig. 24 also shows the gears 44 and 45 and the shaft 45a.

As shown in Fig. 12, the shaft 77 of gear 36 has another gear 78, whose function is later described.

As shown in Fig. 8, the U-shaped mount 34 has an extension 34a, which provides bearings 38 for the shaft 39.

As shown in Fig. 8, a compression spring 506 presses gear 70 and its sleeve 68 against the pins 69 of shaft 39.

The device comprises a conventional lamp, not shown, which illuminates the windows at the front of the device, when the flag is turned down from its "up" position of Fig. 1. For this purpose and other purposes, the device includes one or more electrical circuits.

Figs. 8 and 28 show a longitudinal vertical block 14, made of insulating material, which is fixed detachably to wall 9 by screws 15. This block 14 is located rearwardly of partition plate 47. A series of independent metal contact bars 16 are fixed to insulating block 14. Each contact bar 16 has respective sockets 16b and 16a. The bared ends 12a of insulated rear wires 12 are fixed to respective plug pins 17, which are resiliently held in sockets 16a. Front wires 12b have respective bared ends, which are connected to similar plug pins 17, which are releasably held in sockets 16b. The rear wires 12 are connected to the terminals of the cam-controlled switches of insulating block 21b. The front wires 12b are connected to the lamp or to the terminals of other electrically controlled or operated parts, which may be located forwardly of partition plate 47. The front wires 12b may extend through holes of wall 9. By removing the plug pins 17 of the front wires 12b from their respective sockets, the rear frame can be detached from partition plate 47, without disturbing the connections of front wires 12b to their respective terminals.

As shown in Fig. 8, each cam-operated switch which is associated with insulating block 21b has resilient metal contact posts 343. The inner end of each metal contact post 343 is fixed detachably to block 21b, and said inner end is connected to a respective wire 12. Each cam-operated switch includes a respective resilient and cam-operated switch blade. Two such cam-operated switch blades 341 and 342 are shown in Fig. 8. The switch blade 341 is associated with the contact post 343 which is shown in Fig. 8. The switch blade 342 is associated with another contact post 343, and hence with another circuit. One terminal of the battery or other source of electric current is connected to the inner end of cam-operated switch-blade 341, which is fixed to an insulating extension of block 21b. Fig. 8 shows the resilient cam-operated switch blade 341 in its circuit-opening position, in which said blade 341 abuts a resilient stop-post 344, whose inner end is fixed to said insulating extension of block 21b. The switch-blades 341 and 342 are respectively operated by respective insulating cams 339 and 340, which are fixed detachably to cam-shaft 88, which is operated by the turning of the flag 143. When the flag is turned to a "down" position, the respective cam flexes the respective switch blade 341 or 342, to contact with the respective contact post 343, thus closing the circuit of the lamp or other electrically operated part. The positions of the cam-operated switch-blades in Fig. 8 correspond to the "up" position of the flag 143. The other electrical connections are conventional and not illustrated.

All of the automatically operated parts are located rearwardly of the partition plate 47. It is clear than when the detachable casing Ca is removed, important units of the automatic mechanism can be readily removed. Thus, the removable plate 21 carries the main plug which has the insulating block 21b, and all the cam-operated switches. The rearwardly removable plate 26 carries shaft 74, the gears 71, 70, 75 and the sleeve 68, so that this sub-unit can be readily detached. The mount 34—34a which can be easily upwardly detached from bottom wall 18, carries the shaft 39 and its detachable worms 39 and 43. The mount 40, which can also be easily upwardly detached, carries the four gears 41. Hence the main parts of the automatic mechanism are arranged in respective sub-units, each of which can be individually easily separated from the complete assembly.

The respective walls of rear frame 7 may be detachably connected to each other.

*Mechanism for positioning flag 143 in its respective down positions, and the cam-shaft 88*

Referring to Fig. 1, after a short preliminary release movement in the clockwise direction, the flag 143 is turned counterclockwise from its "up" position of Fig. 1, as indicated by the arrow 143a, to its three respective "down" positions. The flag 143 is also turned counterclockwise in the direction of arrow 143a, from any of its "down" positions, back to its initial "up" position of Fig. 1, which is the "For Hire" position.

Fig. 13 is a rear view of Fig. 1. Hence, when the flag 143 is seen as viewed in Fig. 13, said flag 143 is turned "down" in the clockwise direction of arrow 143b, which is the same as the direction of arrow 143a.

As shown in Fig. 13, flag 143 is fixed to a rod 144, which is fixed detachably to a rod 145, which is fixed detachably to a longitudinal flag-shaft 89, which is also shown in Fig. 2. By selecting the length of rod 144, the flag 143 may be displayed at different heights in its "up" position.

The longitudinal flag-shaft 89 extends through the front plate 1, through a corresponding hole, not shown, in partition plate 47, and it may extend optionally through a corresponding hole in the rear wall of casing Ca. Said flag-shaft 89 is longitudinally detachable from its bearings. As shown in Fig. 2, flag-shaft 89 has a bearing in plate 19, through which the flag-shaft may optionally extend. By making the rear frame 7 longitudinally detachable from partition plate 47, the installation and removal of longitudinal parts like the flag shaft 89 and its accessory parts, and other parts of the mechanism, are greatly facilitated.

By making the flag-shaft 89 of sufficient length so that it extends through plate 1 and the rear wall of casing Ca, the flag 143 may be located at the front or rear of the complete assembled taximeter.

Fig. 13 shows a positioning disc 146 fixed detachably to flag-shaft 89. Said disc 146 has four identical positioning recesses 147, which have equal angular spacings of 90°

A ratchet disc 149 is fixed detachably to flag-shaft 89, by a pin 148. Said ratchet-disc 149 has a series of notches 150, to provide a series of ratchet teeth.

Pawl 151, arm 156, arm 152, and pawl 153 are respectively pivotally connected to plate 1 at its inner face by pivots 154, 157 and 155. Arm 152 and pawl 153 have a common pivot 155.

The respective ends of a tension spring 160 are connected to pawl 151 and arm 156. One end of a tension spring 159 is connected to plate 1, and the other end of said tension spring 159 is connected to arm 156.

The ends of a tension spring 161 are respectively connected to pawl 153 and to plate 1. The ends of a tension spring 162 are respectively connected to arm 152 and to pawl 153. A pin or screw 163, also shown in Fig. 14, is fixed detachably to arm 152. The shank of pin 163 is pressed against pawl 153 by tension spring 162, one of whose ends is fixed to pawl 153.

The arm 156 has a turnable roll 158, which releasably engages the positioning disc 146 at one of its recesses 147. The ratchet-disc 149 has a longitudinal pin 164.

Referring to Fig. 13, when it is desired to turn flag 143 so as to turn flag-shaft 89 in the direction of arrow 143b, the flag 143 and flag-shaft 89 are initially rotated through a small angle in a direction reverse to arrow 143b, thus releasing pawl 153 from its respective ratchet-recess of ratchet disc 149, so that tension spring 161 then turns pawl 153 clockwise as viewed in Fig. 13, so that pawl 153 is temporarily released from ratchet-disc 149, and pawl 153 is held in said released position by spring 161. It is then possible to turn flag 143 and flag-shaft 89 in the direction of arrow 143b.

The roll 158 will releasably maintain the positioning disc 146 in its respective adjusted position, when it is turned in unison with flag-shaft 89, either 90° or 180° or 270° or 360° from its initial "up" position of Fig. 13, in the direction of arrow 143b. In this embodiment, the turning of shaft 89 through an angle of 90° in the direction of arrow 143b to the first "down" position of flag 143 from the "up" position of flag 143, which is shown in Fig. 13, corresponds to the normal or single distance fare rate. When the flag 143 is turned down in unison with shaft 89, 180° and 270° in the direction of arrow 143b, from the "up" position of flag 143, said flag is in its respective "extra fare" and "free waiting time" positions.

After the flag 143 has been turned to any of its "down" positions, the pawl 151 and the associated ratchet-teeth of ratchet disc 149 prevent the return of the flag 143 to its "up" position, save by turning the flag 143 in the direction of arrow 143b.

However, the flag 143 can be turned back and forth between its first and third "down" positions, so that, for example, when the period of free waiting time has expired, the flag 143 can be turned reversely to arrow 143b, from the third "down" position of the flag, either to its second or first "down" positions. This is because the ratchet-teeth of ratchet-disc 149, which cooperate with pawl 151, are confined to a suitable small arc of ratchet-disc 149.

Referring to Fig. 13, when the pawl 153 is released from disc 149 by spring 161 by the short initial turning of disc 149 in a direction reverse to arrow 143b, said pawl 153 will press against pin 163 to turn arm 152 clockwise from its normal position as viewed in Fig. 13 so that the cam-tip of arm 152 will thus be located to be struck by the pin 164 of ratchet disc 149, when ratchet disc 149 and its pin 164 are turned through approximately 360° from its position of Fig. 13, in the direction of arorw 143b. Hence, when the flag 143 is turned from any respective "down" position, back to its initial "up" position, by rotating flag-shaft 89 in the direction of arrow 143b, the pin 164 will strike the cam-surface at the tip of arm 152, thus turning arm 152 reversely to arrow 143b, so that pin 163 will then turn pawl 153 reversely to arrow 143b, thus reengaging disc 149 and pawl 153, which is then retained in position in the corresponding ratchet recess of disc 149. These means for controlling the position of the flag-shaft constitute an important feature of the invention.

As shown in Figs. 2 and 5, the flag-shaft 89 has a worm 90, which meshes with a worm-wheel 91 of the lateral cam-shaft 88. As shown in Fig. 5, said cam-shaft 88 has reduced ends which extend turnably through bearings in the longitudinal walls 8 and 9.

*Main-shaft 93 and operating mechanism*

As shown in Fig. 5, the main shaft 93, which is also designated as the "drop-shaft," is parallel to cam-shaft 88. This main shaft 93 has reduced ends which extend through bearings in the longitudinal walls 8 and 9.

Figs. 5 and 7 show a longitudinal clock-driven shaft 338, which is mounted turnably in a bearing which is fixed detachably to bottom plate 18. As shown in Fig. 7, one end of shaft 338 has coupling pins 337, by means of which shaft 338 can be coupled to the clock drive-shaft which is rotated by the clock mechanism in sub-casing or sub-housing 30.

Fig. 7 shows that shaft 338 has a bevel gear 94 fixed detachably thereto. This shaft 338 and its gear 94 and its U-shaped bearing constitute another sub-unit which can be easily separated from the complete assembly while the other parts remain assembled.

Fig. 5 shows that bevel gear 94 of shaft 338 meshes with a bevel gear 95, which is fixed detachably to lateral clock-driven shaft 96.

Fig. 22 shows that one end of the lateral clock-driven shaft 96 has a bearing in a plate 105, which is fixed detachably by screws 106 to bottom wall 18 of rear frame 7. The other end 99 of shaft 96, which may be hollow or solid, abuts a plate 101, which is fixed detachably to wall 8 by screws 102. Said end 99 may extend turnably into plate 101. Said shaft-end 99 extends through the hub 103a of a lever 103. Said hub 103a is freely turnable relative to shaft-end 99. The hub 104a of a lever 104 is turnable on hub 103a, so that levers 103 and 104 are freely turnable relative to each other. Hubs 104a and 103a have reduced cylindrical edge-portions which are located in a bore of plate 8. Suitable detachable means are provided to prevent axial shifting of hubs 104a and 103a, while permitting their free turning relative to each other and relative to shaft 96.

Fig. 5 shows ratchet-tooth collars 184 and 185, which are fixed detachably to main shaft 93, and identical gears 188 and 187, whose hubs are mounted loosely on main shaft 93.

Fig. 12 shows the ratchet-tooth collar 185 which is fixed detachably to main shaft 93, its ratchet teeth 186, and the pawls 189 which are mounted pivotally on the associated gear 187, said pawls 189 being biased by blade springs 190 to engage the ratchet teeth 186 of ratchet-tooth collar 185. One end of each biasing spring 190 is fixed to gear 187.

Fig. 10 shows a gear 98 which is fixed detachably to the clock-driven shaft 96, which is driven by the clock-mechanism in sub-casing 30, at a regulated and constant angular speed. Fig. 10 also shows the time-levers 104 and 103.

Figs. 10 and 22 also show a plate 109, which is slotted as shown in Fig. 10, so that plate 109 can be adjustably clamped by clamping screw 110, to time lever 104.

Fig. 10 shows a pin 142 which is fixed to time lever 103.

Fig. 10 shows intermeshing gears 107, 111, and 112, which are turnably mounted by respective detachable pivots 108 on adjustable plate 109, a gear 113 mounted detachably and turnably on lever 103, and gears 97 and 98 which are fixed detachably to clock-driven shaft 96, and intermeshing respectively with gears 107 and 113.

Fig. 10 also shows gear 120 which is fixed detachably to main shaft 93, and a forked cam-pin 121, also shown in Figs. 5 and 9, which is fixed detachably and adjustably to one extension of main shaft 93. As shown in Fig. 9, the resilient legs of cam-pin 121 are pressed towards each other to clamp against the respective extension of main shaft 93, by a clamping screw 121a. The radial position of the cam-tip of cam-pin 121 can thus be regulated. Referring to Fig. 10, the positions of time levers 104 and 103 correspond to the "up" position of flag 143.

Fig. 10, and also Fig. 5, show collars 116 and 117 which are fixed detachably to cam-shaft 88, and which have respective pins 118 and 119 which are parallel to the lateral cam-shaft 88.

As shown in Fig. 10, when the flag 143 is in its "up" position, said pins 118 and 119 are located midway between the ends of the arcuate proximate faces of time levers 104 and 103, which are then in their respective unmeshing positions. These arcuate faces are concentric with the axis of cam-shaft 88, and each said arcuate face has an angle of 90°. In Fig. 10, the pins 118 and 119 abut these arcuate faces of the time levers. For convenience, the time-lever 104 is designated as the first time-lever and the time-lever 103 is designated as the second time-lever.

The ends of a tension spring 114 are respectively detachably connected to time levers 104 and 103. Another tension spring 115 has one end detachably connected to wall 8, and its other end is connected detachably to time-lever 103.

Figs. 9 and 10 show a latch-lever 139 which is detachably pivoted at 140 to wall 8. The ends of a tension spring 141 are respectively detachably connected to wall 8 and to latch-lever 139. Said latch-lever 139 has a forked end, one of whose legs has a latch-shoulder 142a. The other said leg 138 has a pin 137.

When the stop pins 118 and 119 are rotated 90° from their "up" positions of Fig. 10, time lever 103 is temporarily held in unmeshing position by its pin 142 and the latch-shoulder 142a of latch-lever 139. Tension spring 114 then turns only the time-lever 104 to its meshing position, so that gear 112 meshes with gear 120, thus turning main shaft 93 and its cam pin 121 by means of the clock-driven mechanism if said clock-driven mechanism is faster than the wheel-drive mechanism. After a selected period of time, the cam-pin 121 will strike pin 137, thus turning latch-lever 139 until its shoulder 142a releases pin 142, thus releasing the second time-lever 103.

Fig. 10 shows that the second time-lever 103 has a bar 400. When said second time-lever 103 is thus released, said second time-lever 103 is turned by tension spring 115, so that the bar 400 first turns the first time-lever 104 to its respective unmeshing position in which gear 112 is unmeshed from gear 120, and the second time-lever 103 is then turned to its meshing position in which gear 113 is meshed with gear 120.

The angle of rotation of main shaft 93, which is required to release the second time-lever 103, is selected by selecting the gear train 107—111—112. These gears may be replaced by gears of other sizes. When said gear train 107—111—112 is thus replaced, the detachable plate 109 is adjusted so as to mesh the end gear 112 with gear 120, when time lever 104 is released. The bar 400 strikes the shank of the clamping screw 110, in order to unmesh gears 112 and 120.

As later disclosed, there is a wheel drive for main shaft 93, in addition to the clock-mechanism drive. When the flag 143 is "up," the clock-mechanism does not operate to drive main shaft 93. When the flag 143 is in its first "down" position or in its second "down" position, the wheel drive of the cab operates the main shaft 93 only when the speed of the cab is above a selected minimum speed, and the clock mechanism drives main shaft 93 when the cab is stationary and also while the speed of the cab is less than the selected minimum speed.

The clock-driven gear-train 97—107—111—112—120 turns the main shaft 93 more slowly than the clock-driven gear-train 98—113—120. Hence the function of the gear-trains shown in Fig. 10, is to turn the main shaft 93 at a selected angle of rotation of said main shaft 93 if the main shaft 93 is then rotated by the clock-mechanism, and then to increase the angular velocity of said main shaft 93 if it is being rotated by the clock-mechanism, as long as the flag is in either its first or second "down" position.

When the flag is reset to its "up" position, it is necessary to reset the parts of Figs. 9 and 10 to their initial positions shown therein.

For this purpose, and as shown in Figs. 5 and 9, one extension of main shaft 93 has a gear 131, detachably fixed thereto. This gear 131 meshes with a gear 132. As shown in Figs. 5, 9 and 23, a heart cam 134 is fixed to gear 132. Fig. 23 shows that gear 132 is fixed detachably to a driven shaft 132a which has a bearing in wall 8, and also in a plate 132b which is detachably fixed to bottom plate 18 by screws 132c.

Fig. 9 shows a cam finger 122 which is fixed detachably to cam-shaft 88, and a lever 124 which is detachably pivoted at 125 to wall 8. An arm 127a is also detachably mounted on pivot 125. Arm 127a and lever 124 are turnable relative to each other on pivot 125. The ends of a tension spring 127 are respectively detachably connected to a pin 130 of lever 124 and to a pin 129 of arm 127a. The ends of a tension spring 126 are respectively detachably connected at 129 and 128 to arm 127a and plate 8. The pin 130 of lever 124 abuts the edge of arm 127a.

Arm 127a has a rigid extension 136 which is fixed rigidly to arm 127a and which has a roll 135 which abuts the heart-cam 134. Lever 124 has a roll 123 which abuts cam-finger 122, when flag 143 is in its "up" position. The position of cam-finger 122 in Fig. 9 corresponds to the "up" position of flag 143.

As viewed in Fig. 9, the cam shaft 88 and its cam-finger 122 are turned clockwise when the flag 143 is turned down. When flag 143 is turned to its first "down" position, cam finger 122 is turned clockwise 90° from its position of Fig. 9, so that it releases cam roll 123. Tension spring 126 then turns arm 127a counterclockwise on pivot 125. Tension spring 127 simultaneously turns lever 124 counterclockwise, because the pin 130 of lever 124 remains pressed against arm 127a. This counterclockwise turning movement of arm 127a will remove the cam-roll 135 from the operating path of heart-cam 134.

When cam finger 122 is reset to its initial "up" position of Fig. 9, it turns lever 124 clockwise back to its initial position of Fig. 9. The corresponding movement of pin 130 of lever 124 will tense spring 127, so that arm 127a will also be turned clockwise back to its position of Fig. 9, so that roll 135 will reset the heart-cam 134 to its position of Fig. 9. If the heart-cam 134 jams for any reason, the spring 127 will be additionally extended and tensed, but arm 127a will not be reset clockwise in unison with lever 124, thus avoiding any breakage or bending of these parts.

As viewed in Fig. 10, the cam-shaft 88 is turned clockwise when the flag 143 is turned down. The pins 118 and 119 remain spaced from the proximate arcuate faces of time-levers 103 and 104, when the flag 143 is turned to its second and third "down" positions. The pins 118 and 119 are reset to their positions of Fig. 10, when the flag-shaft 89 is turned through an angle of 360° to reset flag 143.

*Wheel-drive*

As previously noted, Fig. 8 shows the wheel coupling C for the wheel-drive of shaft 39, and a worm 37 for rotating gear 36 of wheel-driven shaft 77, so that the angular velocity of wheel-driven shaft 77 depends upon the speed of the cab.

Fig. 12 shows a normal rate-fare lever 79 and an extra rate-fare lever 82. These fare levers 79 and 82 are loosely mounted on wheel-driven shaft 77. Gear 83 is turnably and detachably connected at pivot 84 to fare lever 82, and gear 80 is turnably and detachably connected at pivot 81 to fare lever 79. The ends of a tension spring 85 are respectively detachably connected at pins 87 and 86 to levers 82 and 79. Fig. 12 shows the positions of fare levers 82 and 79, when the flag 143 is in its "up" position, in which neither of the gears 83 nor 80 meshes with the gear-teeth of the gear 187. Fig. 8 shows gear 83 meshing with gear 187 in a "down" flag position.

As viewed in Fig. 12, the tension spring 85 biases the normal rate fare-lever 79 to turn counterclockwise relative to wheel-driven shaft 77, and said tension spring 85 biases the extra rate-fare lever 82 to turn clockwise relative to wheel-driven shaft 77.

Fig. 5 shows discs 92a and 92b which are fixed detachably to cam-shaft 88, and pins 92c and 92d, which are parallel to cam-shaft 88. These pins 92c and 92d are diametrically opposed as also shown in Fig. 12. Figs. 5 and 12 also show a cam 92, which has a cam-recess. Said cam 92 is fixed detachably to a cut-out disc 92e. As shown in Fig. 12, said cut-out disc 92e has a recess which has parallel planar walls W, which are parallel to the diameter of cam-shaft 88 which joins the centers of the pins 92c and 92d.

As shown in Fig. 12, the normal rate-fare lever 79 has a curved cam-nose 79a. The extra rate-fare lever 82 has a similar cam-nose 82a.

When the flag 143 is in its "up" position of Fig. 12, the cam-nose 79a of lever 79 abuts pin 92c, so that gears 187 and 80 are unmeshed. In this "up" position of cam-shaft 88, the cam-nose 82a of extra rate-fare-lever 82 abuts the cylindrical periphery of cam 92, so that gears 83 and 187 are held unmeshed.

When the flag 143 is turned 90° to its first "down" position, the cam-shaft 88 is turned clockwise through an angle of 90° as viewed in Fig. 12, so that pin 92c clears cam-nose 79a, so that gears 80 and 187 are meshed. In said position of cam 92, the cam-nose 82a of extra rate-fare lever 82 still abuts the cylindrical periphery of cam 92, so that gears 83 and 187 remain unmeshed.

When the flag 143 is turned 180° to its second "down" position, pin 92d is moved to the position of pin 92c in Fig. 12, thus moving lever 79 back to its position of Fig. 12, and unmeshing gears 80 and 187. The cam recess of cam 92 is now aligned with the cam nose 82a of lever 82, so that gears 83 and 187 are meshed.

When the flag 143 is turned 270° to its third "down" position, pin 92d clears cam-nose 79a, and the cam-nose 82a of extra rate-fare lever 82 abuts the cylindrical periphery of cam 92, thus keeping gears 83 and 187 unmeshed. Hence, when the flag 143 is in its third "down" position, the normal fare mechanism as controlled by lever 79 will operate, if the cab moves.

Whenever the gear 187 meshes either with gear 80 or gear 83 and the cab is moving and the flag is in its first or second "down" position, either the clock-drive or the wheel-drive will actuate main shaft 93, depending on which drive is more rapid.

It is clear that the shaft 93 will be turned at greater angular velocity by the wheel-drive in the second "down" position of the flag 143 than in the first "down" position of said flag, by means of wheel-driven shaft 77.

*Mechanism for controlling the registering of fare in the first fare-zone*

As previously noted, there are many localities in which an initial minimum fare is charged for an initial selected distance, so that said minimum fare must be paid, if the trip is less than said initial selected distance. Thereafter, additional fare units are charged. This initial selected distance is designated as the first fare-zone.

Figs. 5 and 11 show a gear 190' which is fixed detachably to a respective extension of main shaft 93. Fig. 11 shows this gear 190' meshing with a larger gear 192, whose shaft has a bearing in wall 9. As viewed in Fig. 11, gear 192 turns clockwise. The shaft of gear 192 is detachable from wall 9.

Gear 192 has a scale which has markings 197, which are optionally equally angularly spaced. Fig. 11 shows arm or lever 194 provided with an index 197a for said scale. Fig. 11 corresponds to the "up" position of flag 143. I can adjust gear 192 so that when the flag 143 is in its "up" position in which the parts are in the relative positions of Fig. 11, any selected marking of scale 197 registers with index marking 197a. I can thus make said first fare-zone longer or shorter.

This gear 192 has a pin 193, whose initial angular position relative to index 197a can be thus selected while flag 143 is in its "up" position.

Arm 194 is detachably pivoted at 195 to wall 9. The ends of tension spring 196 are detachably fixed respectively to wall 9 and arm 194. At its free end, arm 194 is forked to provide two legs, and one of said legs has a shoulder which abuts the end of a movable rod 199 when the flag is in its "up" position. This rod 199 is movable in hole 198 of wall 9. Said stop-shoulder of arm 194 holds rod 199 from moving to the left, as rod 199 is viewed in Fig. 11. When gear 192 has turned through a selected angle, which is selected by angularly adjusting pin 193 relative to index 197a, said pin 193 turns the arm 194 counterclockwise or upwardly as viewed in Fig. 11, so that said stop-shoulder releases rod 199. Rod 199 is thus released after gear 192 has been turned through a selected angle of less than 360°.

Fig. 6 shows that one end of rod 199 is detachably connected to a fare-unit arm or drop arm 200, which is pivoted detachably at 201 to bottom wall 18.

One end of a tension spring 202 is detachably fixed to fare-unit arm 200. The other end of tension spring 202 is detachably fixed to the tie-rod 203 which is fixed to walls 8 and 9.

As shown in Fig. 6, the fare-unit arm 200 has a tooth 204, and a cam wheel 205 is fixed detachably to main shaft 93. Said cam wheel 205 has teeth 206 and cam surfaces 207.

When rod 199 is released by the arm 194 which is shown in Fig. 11, the tension spring 202 turns fare-unit arm 200 clockwise as viewed in Fig. 6; so that the cam wheel 207 can then rock the fare-unit for each complete rocking movement of fare-unit arm 200 after the initial zone. As viewed in Fig. 6, the main shaft 93 and the cam wheel 205 are turned clockwise. Each cam face 207 turns fare-unit arm 200 against tension spring 202, and each tooth 206 permits the tension spring 202 to turn the fare-unit arm 200 clockwise, as viewed in Fig. 6. The fare-unit arm 200 is pivotally and detachably connected to a link 297 which operates the register at station 294 by conventional means, to register each complete rocking movement of rock arm 200, thus registering the fare units after the initial fare zone. The link 297 is detachable from the register means at station 294.

*Mechanism for exhibiting initial minimum fare and additional fare units*

Fig. 6 shows that one end of arm 200 is pivotally connected at 209 to link 208, which is pivotally connected by a cylindrical pin 210a to bent arm 212. Fig. 15 shows that arm 212 is pivoted at 213 to top plate 64 of sub-casing 63. The pivot pin 210a is fixed to arm 212, and said pin 210a is located in a slot of link 208. The ends of a tension spring 214 are respectively detachably connected to pin 210a and to link 208, thus pressing the shank of pin 210a against one end of the slot of link 208. Said slot is wider than said pin 210a. By detaching spring 214 from pin 210a, the link 208 can be turned up from its position of Fig. 15, thus easily detaching link 208 from arm 212, when it is desired to replace a sub-casing 63 and the parts therein. The slot of link 208 provides a relative limited movement between link 208 and bent arm 212.

Plate 64 is fixed detachably by rods 269 and screws 270 to the parallel plate 268 which is shown in Fig. 21. This plate 268 is the bottom wall of sub-casing or sub-housing 63.

Fig. 15 also shows that arm 212 is pivotally connected at 215 to a link 216, which is pivotally connected at 217 to an arm 218 which is pivoted at 219 to plate 64.

Fig. 15 shows four discs 228, 233, 234 and 235. As shown in Fig. 21, the disc 228 is turnable relative to the respective extension 267a of a respective shaft 267, which has bearings in the parallel top and bottom plates 64 and 268 of sub-casing 63.

Figs. 15 and 21 show respective ratchet wheels or ratchet discs 239 and 258 which are fixed to each other, and which can turn in unison relative to disc 228. Said ratchet wheels 239 and 258 are fixed to their respective shaft-extension 267a so that ratchet wheels 239 and 258 turn in unison with their respective shaft extension 267a. Fig. 21 shows a collar 229 which is fixed detachably by screw 273 to shaft-extension 267a, and an anti-friction washer W' which is located between ratchet wheel 239 and disc 228. Fig. 21 also shows a drum 266, on which the respective fare units which correspond to disc 228 are marked. This drum 266 is fixed detachably to a collar 270, which is fixed detachably to shaft 267, as by a set screw or other conventional means. The lower end of a helical torsion spring 272 is fixed to plate 268, and the upper end of said torsion spring 272 frictionally engages the shaft 267, without being fastened rigidly to shaft 267. This torsion spring 272 is of special design, and it is one of the important features of my invention. If the upper end of torsion spring 272 were fixed to shaft 267, such torsion spring 272 would be excessively wound, if the drum 266 were turned many times in the same direction against the torsion of spring 272 to exhibit successive small fare units, such as five cent fare units. By providing the torsion spring 272 with the tapered axial shape shown accurately in Fig. 21, so that said tapered axial shape has two angles, and decreasing the pitch of said helical torsion spring 272 towards its upper narrow end, so that the coils abut or substantially abut each other and are of equal diameter at said upper end, a slipping frictional grip of said spring 272 is secured at said top end coils on shaft 267 at the unfastened upper end of spring 272, thus preventing overwinding of said spring 272, while keeping it under sufficient torsion to return drum 266 to its initial position against a suitable stop.

Each disc 233—234—235 is also held by a respective collar 229 on and turnable relative to a respective shaft extension 267a, and Fig. 21 applies generally to all the discs 228—233—234—235 and their associated parts, save for certain differences in the ratchet-wheel drives of the respective shafts 267 which are later disclosed.

As shown in Fig. 15, each collar 229 has a ratchet-tooth which is associated with a respective pawl 261, which is biased to turn counterclockwise as viewed in Fig. 15 by a respective tension spring 265, so that collars 229 can be turned only in the counterclockwise direction, as viewed in Fig. 15. One end of each spring 265 is connected to a pin 262, which is fixed to plate 64.

In addition to arm 218 pivoted at 219 to plate 64, Fig. 15 shows arms 212, 249 and 246, respectively pivoted to plate 264 at 213, 250 and 247. Pawls 222, 220, 237 and 238 are respectively pivoted to arms 218, 212, 249 and 246 at 223, 221, 248 and 245. Said pawls 222, 220, 237 and 238 are biased to turn counterclockwise relative to arms 218, 212, 249, 246, as viewed in Fig. 15, by respective springs 227, 226, 243 and 244. One end of each said spring 227, 226, 243, 244 is fixed to the respective arm 218, 212, 249, 246. The other ends of said springs 227, 226, 243, 244 are connected to their respective pawls.

The pawls 222 and 220 have respective pins 225 and 224.

Each disc 228, 233, 234 and 235 has a respective tongue 230. Each tongue 230 is pivotally connected to a common link or rod 232, at respective pivots 232a.

One end of a tension spring 232b is fixed to partition plate 47 and the other end of spring 232b is fixed to the common rod or link 232, so that discs 228, 233, 234, 235 are normally held in the positions of Fig. 15, which correspond to the "up" position of the flag.

Said discs have respective pins 236.

Lever 226c is pivoted at 227 to plate 64. Said lever 226c has arms 226b and 226a. In the initial positions of the respective drums 266, which correspond to the "up" position of flag 143, nose 284 of arm 226b abuts one of the teeth of ratchet disc 258, and arm 226a abuts pin 224 of pawl 220.

Figs. 2 and 24 show that a disc 251, which has a single recess 252, is fixed to flag-shaft 89.

Fig. 24 shows a slide-plate 253. Said slide-plate 253 has elongated holes 255. The shanks of headed screws 254 extend through holes 255. The shanks of said screws 254 are fixed to the partition plate 47 so that plate 253 is slidable back and forth relative to partition plate 47 in the lateral direction. Said plate 47 is not shown in Fig. 24, in order to show the other parts more clearly. The ends of a tension spring 256 are respectively fixed to plate 47 and to slide-plate 253. Roll 257 is connected turnably to slide-plate 253. When the flag 143 is in its "up" position, roll 257 is located in recess 252. When the flag 143 is turned to any of its "down" positions, the disc 251 pushes and maintains slide-plate 253 to the left of its position of Fig. 24. Said slide-plate 253 has a projection 253a which abuts a lug 254a of the link or rod 232.

Referring to Fig. 15, when the slide-plate 253 is actuated by moving the flag 143 to any of said three "down" positions, the rod or link 232 is pushed by projection 253a and lug 254a to the left of its position shown in Fig. 15 against the force of spring 232b, thus turning discs 228, 233, 234, 235 clockwise on their respective shaft extensions 267a as viewed in Fig. 15, thus releasing pins 236 from pawls 222, 220, 237, and 238, so that said pawls can turn counterclockwise from their positions of Fig. 15, to respectively engage the ratchet discs 239, 240, 241, 242. As previously noted, said ratchet discs 239, 240, 241, 242 are fixed to their respective shaft extensions 267a and they turn freely relative to their respective discs 228, 233, 234, 235, and ratchet disc 258 is fixed to ratchet disc 239, so that ratchet disc 258 can also turn freely relative to disc 228.

The ratchet discs 239, 240, 241, 242, are associated with respective pawls 259. As viewed in Fig. 15, each pawl 259 is biased to turn counterclockwise by a respective tension spring 263. Each pawl 259 is mounted turnably on a respective pivot 260. An end of each tension spring 263 is connected to a respective pin 262 of plate 64. When said pawls 259 engage their respective ratchet discs 239, 240, 241, 242, said pawls 259 prevent reverse turning of their associated ratchet discs 239, 240, 241, 242, namely, they prevent turning clockwise as viewed in Fig. 15. Each pawl 259 is associated with a respective stop pin 264 on the respective disc 228, 233, 234, 235, so that said pawls 259 are held in the positions of Fig. 15, when the flag 143 is in its "up" position, so that said pawls 259 are then disengaged from their respective ratchet discs 239, 240, 241, 242.

In this embodiment, the actuation of the ratchet disc 239 displays the smallest fare unit, as $0.05; the ratchet disc 240 corresponds to the next higher fare unit, as $0.10; the ratchet disc 241 corresponds to the next higher fare unit as $1.00; and the ratchet disc 242 corresponds to the next higher fare unit as $10.00. In this embodiment, each ratchet disc 239, 240, 241, 242 has ten teeth, which are equally angularly spaced by angles of 36°.

As previously noted and as shown in Fig. 6, each complete rocking movement of arm 200 reciprocates the link 208 which is also shown in Fig. 15, in a single stroke, so that the bent arm 212 is given a corresponding single rocking stroke around its pivot 213.

At each single rocking stroke of arm 212, the arm or lever 218 is given a single rocking stroke around its pivot 219 by link 216. When the flag is "down" so that pawl 222 engages ratchet disc 239, said ratchet disc 239, which has ten equally spaced teeth in this embodiment, is thus turned intermittently in the same direction and in unison with ratchet disc 258, through respective angular strokes of 36°, thus turning the respective drum 266 in the same direction through respective successive angular strokes of 36°, since ratchet discs 239 and 258 are fixed to the respective shaft-extension 267a which is shown in Fig. 21.

In this embodiment, ratchet disc 258 has five equally spaced ratchet teeth. At each second 36° stroke of the ratchet disc 239, the nose 284 of lever 226c, which is biased to turn clockwise as viewed in Fig. 15 by a suitable torsion spring at pivot 227, which is not shown, will enter a recess of ratchet disc 258. The leg 226a will then release pin 224, so that pawl 220 will engage and operate ratchet disc 240 in a single stroke of 36°, at each second stroke of ratchet disc 239.

In this embodiment, the drum 266 which is associated with ratchet disc 239 has successive markings "5" and "0," which are displayed successively at the opening 276a of the respective front plate 276 of the sub-casing 63, when the shutter 275 is raised from the full-line position of Fig. 21 to the broken-line position of Fig. 21.

In this embodiment, the respective drums 266 which are respectively associated with ratchet discs 240 and 241 have a series of numbers "0, 1, 2, 3, 4, 5, 6, 7, 8, 9," which are successively displayed at the respective opening 276a. The drum 266 which is associated with ratchet disc 242 also has a series of numbers "0–9."

Fig. 15 shows that each ratchet disc 240 and 241 is fixed to a respective toothed disc 285, which has a single ratchet recess 286. The toothed discs 285 therefore turn in unison with ratchet discs 240 and 241 and the respective shaft-extensions 267a relative to discs 233 and 234 which are not fixed to the respective shaft-extensions 267a.

When the discs 233 and 234 are turned clockwise, as viewed in Fig. 15, by the actuation of the slide-plate 253, the pins 287 of discs 233 and 234 are moved away from their respective levers 249 and 246, so that said levers 249 and 246 can turn counterclockwise, as viewed in Fig. 15. For this purpose, a pin of lever 246 is fixed to a tension spring 246a, whose other end is fixed to a pin of plate 64. Lever 249 has a similar tension spring which is not shown.

At window 4a, the respective numbers corresponding to ratchet disc 239 are displayed at the right.

As one example, it is assumed that the initial minimum fare for the initial zone is $0.20. In such case, when the flag 143 is turned down, thus raising shutter 275, the respective drums 266 of ratchet discs 239—258 and 240, will respectively exhibit "0" and "2," and the respective drums 266 of ratchet discs 241 and 242 will exhibit "0." The first stroke of fare-unit arm 200 will actuate ratchet discs 239—258 to exhibit "5" on the respective drum 266, without operating the other three drums 266. The next stroke of arm 200 will operate the drum 266 of ratchet discs 239—258 to exhibit "0" and during said stroke of arm 200, the nose 234 of leg 266b will enter a recess of ratchet disc 252, so that the drum 266 of ratchet disc 240 will operated by pawl 220 to display "3."

When the drum 266 of ratchet discs 239—258 indicates "5" and the drum 266 of ratchet disc 240 indicates "9," the next stroke of arm 200 will change the indications of said drums to "0," and during said stroke of arm 200 the nose of arm 249 will enter the recess 286 of the respective disc 285 so that spring 284a and pawl 237 will turn ratchet disc 241 through an angle of 36° during said next stroke of arm 200, thus changing the indication of the drum 266 of ratchet disc 241 from "0" to "1." When the ratchet disc 241 has been given nine strokes, the nose of arm 246 will enter the respective recess 286 during the tenth stroke, so that pawl 238 will actuate ratchet disc 242 during the tenth stroke of ratchet disc 241, thus changing the indication of drum 266 of ratchet disc 242 from "0" to "1," so that the four drums 266 will indicate "$10.00."

These drums and the mechanism for operating the same can be easily modified according to the respective local currency.

As shown in Fig. 15, respective discs 288 can be fixed to the tips of shaft extensions 267a, so as to indicate the respective fare to the driver at the top of sub-casing 63 through a window opening at the top of casing Ca.

Fig. 11 shows the mechanism for operating the shutter 275. Fig. 11 shows the positions of the parts which correspond to the "up" position of the flag. Said shutter has a pin 277 which is associated with an arm 278, pivoted at 279 to wall 9. Said arm 278 has a cam nose 281, which is associated with cam 280, which is fixed to cam shaft 88. When the flag 143 is in any of its "down" positions, cam nose 281 abuts the cylindrical periphery of cam 280, so that shutter 275 is held in its upper position to clear the opening or window 4a, which is alined with window opening 276a of plate 276 which is shown in Fig. 21.

As shown in Fig. 15, the shutter 275 is fixed to a guide rod 282, which is guided in a guide cylinder 283 which is fixed to plate 268, and which extends through plate 64.

When the flag 143 is reset to its "up" position, the slide 253 and its associated rod 232 are moved back to their positions of Fig. 24 and the control discs 228, 233, 234, 235 are turned counterclockwise as viewed in Fig. 15, thus moving the pawls 222, 220, 237, 238 to their non-operating positions shown in Fig. 15, so that the respective torsion springs 272 can turn the respective drums 266 to their respective initial positions. It is unnecessary to use the special type of torsion spring 272 with the drums 266 which indicate the higher fare units.

*Registering extra fare charges*

Fig. 1 shows respective buttons 298 and 296 for registering extra passenger and extra luggage charges. Figs. 16 and 18 show the means for displaying and registering the extra charge for extra passengers as controlled by button 298.

As shown in Fig. 18, button 298 is fixed to a shank which has an internal head 299'. As shown in broken lines in Fig. 16, said internal head 299' has an oval shape, in order to clear adjacent parts. When internal head 299' is pushed inwardly, it pushes against the pivot pin 300, by means of which the pawl 301 is pivoted to arm 302, which is pivoted at 303 to a wall of the sub-casing 51. Spring 304 biases pawl 301 to turn counterclockwise relative to arm 302, as viewed in Fig. 16. The ends of a tension spring 305 are respectively connected to arm 302 and to the tongue of a disc 306 which is rotatable on a shaft extension 267a, whose shaft is mounted turnably in sub-casing 51. Said shaft is also fixed to ratchet disc 307 and to a collar 308. Pawls 310 and 311 are pivoted at the same pivot to the tongue of disc 306. The construction is generally the same as in Fig. 15. Respective tension springs 312 and 313 are connected to pawls 310 and 311, and to a pin which is fixed to a wall of sub-casing 51. Pawl 311 is associated with the ratchet recess of collar 308, and pawl 310 prevents reverse movement of ratchet disc 307, when pawl 310 is in its operating position. A pin 310a of disc 306 holds pawl 310 in the non-operating position shown in Fig. 16, when the flag is "up" and another pin 309 of disc 306 holds pawl 301 in the respective non-operating position, when the flag 143 is "up."

When the flag 143 is turned down, the slide-plate 253, which abuts the end of the tongue of disc 306, turns disc 306 clockwise as viewed in Fig. 16, thus turning disc 306 relative to ratchet disc 307, and thus shifting the pins 310a and 309, so that pawls 310 and 301 can engage ratchet disc 307, in the operating positions of said pawls 310 and 301.

It is thus impossible accidentally to operate the ratchet disc 307 when the flag 143 is "up." When the flag 143 is "down," each push of button 298 will operate ratchet disc 307 in a respective stroke. In this illustration, the extra charge for each additional passenger is $0.10, so that the exposed wall of casing 51 has a fixed marking 309b which is "0" in this illustration, and said wall has an opening 309a for exposing the respective numerals of a drum which is like drum 266 and which is also provided with a resetting torsion spring. The totalizing registering mechanism for this extra passenger charge, at station 292 of Fig. 24, is operated by arm 302. Fig. 16 shows an arm 314 which is pivotally connected at 315 to arm 302. As also shown in Fig. 16, arm 314 has a stop nose 314n which abuts a pin 316 of slide plate 253 when the flag is "up." The operating position of arm 314, when the flag is "down," is shown in broken lines in Fig. 16.

Referring to Fig. 16, when slide plate 253 is moved to the right as viewed in Fig. 16, namely, when the flag 143 is turned "down," said pin 316 releases arm 314 so that it can drop into its broken-line operating position by turning on pivot 315. When slide-plate 253 is moved to the end of its stroke to the right of its position of Fig. 16, pin 316 acts as a stop to limit the downward turning movement of arm 314. When arm 314 is in its broken-line operating position, each stroke of arm 302 by internal head 299' will actuate a pin 317 in a respective stroke by means of arm 314. Said pin 317 operates the registering wheels at station 292 by conventional means.

The mechanism for registering the extra charge for luggage at station 291 of Fig. 24 and which is shown in Figs. 17 and 20, is substantially the same in many respects as that shown in Figs. 16 and 18.

The elements 302a, 314a, 316a and 317a correspond to elements 302, 314, 316, 317. Fig. 24 also shows the disc 306a of the mechanism at station 291 for recording a luggage charge. Disc 306a corresponds to disc 306.

Fig. 20 shows that finger or lever 317a, which is pivoted to a wall of the sub-casing 63 at 320, has a pawl 318 which is pivoted to said finger 317a at 319. Said pawl 318 is biased by spring 321 to engage ratchet disc 322, which is fixed to a gear 323 which meshes with the gear 290 of the first wheel of a conventional recording series.

The usual retaining pawl 324 is pivotally connected to finger 317a, and said pawl 324 is biased to engage ratchet disc 322, to prevent reverse movement thereof. The finger 317a has an extension 325 which prevents overrunning of the ratchet disc 322. The extra passenger charge is registered by similar mechanism.

When the flag 143 is moved back to its "up" position, conventional torsion springs, not shown, return the discs 306 and 306a back to their initial positions, as exemplified by the position of disc 306 in Fig. 16. The pins of said discs 306 and 306a, such as the pin 309 of disc 306, are thus moved back to release the pawls, such as pawl 301, from their respective ratchet discs, such as ratchet disc 307. The respective drums 266 which are located in casings 50 and 51 are then returned to their initial positions by their respective torsion springs, against suitable stops.

Register of number of paid trips

Figs. 5 and 7 show a disc 326 which is fixed to cam shaft 88. Fig. 7 shows that disc 326 has a pin 327 which abuts the arcuate face of a lever 328, when flat 143 is up. Lever 328 is pivoted at pivot 329 to a mount which is fixed detachably to bottom wall 18.

As viewed in Fig. 7, lever 328 is biased to turn counterclockwise by a conventional torsion spring, which is not shown. A lever 335 is pivoted at 336 to the mount of lever 328. In its position of Fig. 7, a part of lever 328 overlies a part of lever 335. When the flag 143 is moved to a "down" position, the pin 327 releases lever 328. The lever 328 turns counterclockwise, thus releasing lever 335 which is biased to turn counterclockwise by a conventional spring around its pivot 336. Each said movement of lever 335 imparts one stroke to the register wheels at station 294 by conventional means, as of the type shown in Fig. 20.

Operation of register wheels at station 295 for indicating paid distance

Fig. 24 shows a tension spring 500, whose upper end is connected to the frame 501 of the sub-housing 58. The lower end of spring 500 is connected to a shift lever 502. Said shift lever 502 is not fixed to slide plate 253. The head of said shift lever 502 abuts an extension 503 of slide plate 253.

As previously noted, and as shown in Fig. 8, the wheel drive operates a train of gears 41, which rotate the gear 45, which is fixed to shaft 45a, which is also shown in Figs. 24 and 27.

Figs. 24 and 27 show that shaft 45a has an integral extension 45b. Fig. 27 shows a gear 45d is provided with an off-center pin 334, and also with a hub 45h which is loose on shaft 45a—45b.

A clutch sleeve 331 is slidable on extension 45b. Said sleeve 331 has one or more axial recesses. A pin 331b which is fixed to said extension 45b is located in each said recess. Hence sleeve 331 rotates in unison with shaft 45a—45b. A crown gear 230', is provided at the end of sleeve 331 which is proximate to pin 334. When clutch sleeve 331 is slid to the left of its position of Fig. 27, the pin 334 meshes with crown gear 230', so that gear 45d is rotated to actuate the register of paid distance at station 295. The shift lever 502 is pivoted at 502b to the interior frame of sub-casing 58. This lever 502 has a pin 502a, which is located in a circumferential recess 331r of clutch sleeve 331. When the flag 143 is turned down, the projection 503 of slide plate 253 is shifted from the full-line position of Fig. 27 to its broken-position, thus shifting clutch sleeve 331 to rotate gear 45d. This gear 45d is held against shifting along shaft 45a—45b by the recording mechanism at station 295.

Each register disc at the stations 291, 296, 295, 294, 293 and 292 is designated by a reference numeral 289, and its respective gear is indicated by a reference numeral 290.

Since the register means are conventional, they are not illustrated in detail.

Indication of extra fare rate

Fig. 14 shows a disc 504, which is fixed to flag-shaft 89. This disc has a series of numbers to indicate the respective positions of the flag. The respective indicating number on disc 504 is displayed through window 6a.

Resetting the lever 200

As shown in Fig. 6, camshaft 88 has a resetting cam finger 507. When the flag 143 is reset to its "up" position, cam finger 507 pushes against roll 508 of lever 200, thus resetting it to the position of Fig. 6 and also resetting rod 199 to the position of Fig. 11. When the flag 143 is down, the cam finger 507 releases the lever 200, so that it can be rocked as previously described.

Clock mechanism and free waiting time

This embodiment shows a spring clock which has a winding shaft 31 which extends through hole 31a and a corresponding hole in the rear of the frame and a hole in partition plate 47. If an electric clock is used, its circuit is controlled by one of the automatic switch devices shown in Fig. 8.

If a spring clock is used, its spring is wound by turning shaft 31 by the knob 165 which is shown in Fig. 1. The winding shaft 31 extends through the front and rear of the device, and it is provided with a winding knob 165 at either end thereof. I can use a short winding shaft which can be coupled with shaft 31. Said winding shaft can be used either at the front or rear.

Fig. 25 shows a disc 166 which is fixed to flag-shaft 89. The position of disc 166 in Fig. 25 corresponds to the "up" position of the flag. As viewed in Fig. 25, said flag-shaft 89 is turned clockwise when flag 143 is turned down. Said disc 166 has two pins 167 and 168, whose angular spacing is 90°. When the flag 143 is up, pin 167 abuts the arcuate face of a lever 169, which is pivoted at 170 to plate 32a. The ends of a tension spring 171 are respectively connected to lever 169 and plate 32a. When the flag 143 is turned to its first "down" position, thus turning flag-shaft 89 through an angle of 90°, from its position of Fig. 25, pin 167 releases lever 169, so that lever 169 is turned to its broken-line position of Fig. 25, in which said lever 169 abuts the cylindrical part of the flag-shaft 89. In such position, the lever 169 releases the escapement of the spring clock-mechanism by conventional means, so that the clock-mechanism is free to drive the main shaft 93 to record paid waiting time, and also when the clock drive is faster than the wheel drive when the cab is moving. The escapement remains released in the second "down" position of flag 143. In the third "down" position of flag 143, pin 168 engages said arcuate face of lever 169, thus moving it back to the full-line position of Fig. 25, in which the clock-mechanism is rendered non-operating by locking its escapement.

The clock-mechanism is illustrated conventionally in Figs. 25 and 26, since any standard type of clock-mechanism may be used. The parts of such mechanism includes the usual drum 173 for housing the main torsion spring, and winding mechanism for said main spring, which includes the ratchet disc 174 which is fixed to winding shaft 31, and which is turned by pawls 175a for winding the spring. Pawl 175 prevents reverse turning of ratchet disc 174. The main gear 176, which is rotated by the torsion spring of the clock, meshes with gear 177 which is on the same shaft as gear 178, which meshes with gear 179, which is on the same shaft as gear 180, which meshes with gear 181 of the escapement wheel 182. The escapement 183 has the usual escapement spring 172.

The invention includes numerous sub-combinations, some of which are as follows:

The separable partition plate 47 which provides a compartment in which all the sub-casings are compactly arranged; the separable rear plate 21, and plate 72 which is separably attached to plate 26 on which is carried a gear or gears of the wheel-drive; the separable rear frame 7 which carries the flag-shaft, the camshaft and the shaft 39; the shaft 39 which carries the means for operating the register of total distance and the register of paid distance; the mechanism shown in Fig. 11, which regulates the angle of rotation of the main shaft 93 before the recording of additional fare units begins; the positioning means shown in Fig. 13, whereby the flag-shaft can be turned in a selected direction to three respective down positions, said flag-shaft can be turned back and forth between said respective down positions, and the flag-shaft must be turned in said selected direction finally to restore the flag to its up position; the double ratchet-disc 239—258 and the arm or lever 226c; the slide-plate 253 operated by the flag-shaft to prevent recording of extra charges unless the flag is in a down position, in addition to other functions of said slide-plate 253; connecting the resetting torsion spring 272 frictionally to a respective drum 266, in order to prevent overwinding of said torsion spring; providing a free waiting time position for the flag.

I have disclosed a complete embodiment of my invention, but numerous changes and omissions and additions and substitutions can be made without departing from its scope.

The invention also includes numerous other sub-combinations of the parts disclosed herein.

I claim:

1. A taximeter comprising a transverse outer plate carrying a plurality of longitudinal studs extending rearwardly therefrom, a transverse partition plate fixed detachably to the rear ends of said studs, said partition plate having rectangular cut-outs formed in the top and bottom edges thereof, a plurality of intermediate sub-casings fixed detachably to said partition plate, said intermediate sub-casings being located between said partition plate and said outer plate, one of said sub-casings being registered with the cut-out in the bottom edge and another of said sub-casings being positioned below the cutout in the top edge, additional sub-casings which are fixed detachably to the side edges of said partition plate, said additional sub-casings being also located between said outer plate and said partition plate, each said sub-casing having a sub-casing opening, said outer plate having plate openings which are alined respectively with said sub-casing openings, each said sub-casing having therein a respective sub-assembly of movable display parts which exhibit a respective operation of the taximeter, said movable display parts being located to be visible through said alined openings, a rear frame which is connected to said partition plate at its rear face, said taximeter having operating mechanism mounted on said rear frame, said operating mechanism being longitudinally separable connected by detachable connecting means extending through said cutouts to the sub-assemblies of said first mentioned intermediate sub-casings to operate the respective sub-assemblies therein, and manually actuated additional operating means extending longitudinally through said outer plate and located to operate the sub-assemblies of said additional sub-casings.

2. A taximeter according to claim 1, in which said first-mentioned operating mechanism includes clock-drive mechanism and wheel-drive mechanism and a shaft to which said clock-drive mechanism is connected, and said wheel-drive mechanism is connected to said shaft by a slip-connector which slips relative to said shaft when said clock-drive mechanism is faster than said wheel-drive mechanism.

3. In a taximeter which comprises separate sections each of which is removable without first disturbing any other section thereof; the combination of a removable section including a series of drums rotatable about vertical axes for indicating the fare for a respective trip, a main shaft, clock-drive mechanism connected to said main shaft, wheel-drive mechanism connected to said main shaft by a slip-connector which slips relative to said main shaft when said clock-drive mechanism is faster than said wheel-drive mechanism, a pivoted arm swinging in a vertical plane, means mounted on said main shaft and adapted to oscillate said pivoted arm, drum-operating mechanism adapted to rotate said drums to indicate the fare, a lever swinging in a horizontal plane for actuating said drum-operating mechanism, said lever having a pin, a link connected at one end to said pivoted arm, said link having a slot at the other end through which said pin extends when said link and said lever are assembled, said slot being oversized relative to said pin to permit a sliding movement of said link in the direction of its axis relative to said pin, and a tension spring connected to said pin and said link and maintaining said pin at one end of said slot.

4. In a taximeter which comprises separate sections each of which may be removed without first disturbing any other section thereof; the combination of a clock-mechanism, a clock-driven shaft which is connected to said clock-mechanism to be rotated by said clock-mechanism, a first time-lever and a second time-lever, each said time-lever being mounted pivotally on said clock-driven shaft and being turnable relative to said clock-driven shaft, a plate on said first time-lever and formed with an arcuate slot, fastening means extending through said slot into said first time-lever for adjustably securing the plate on the latter, time-lever gear train means mounted on said plate and meshing with gear means on said clock-driven shaft, time-lever gear-means mounted on said second time-lever and meshing with said gear-means on said clock-driven shaft, a main-shaft, a main-shaft gear fixed to said main shaft, a first tension spring connected to said time-levers and biasing said time-levers to turn into respective meshing positions in which their time-lever gear-means mesh with said main-shaft gear, a second tension spring connected to said second time-lever and to the frame of the taximeter and also biasing said second time-lever to turn to its respective meshing position, a flag-shaft, said flag-shaft having a "For Hire" position, a control shaft which is connected to said flag-shaft, said control shaft having control holding-means which hold said time-levers in respective non-meshing positions when the flag-shaft is in its "For Hire" position, said holding means releasing said time-levers when said flag-shaft is turned from said "For Hire" position, a latch-lever pivoted to said frame and latching said second time-lever in non-meshing position, a spring which biases said latch-lever to latching position, an unlatching cam pin connected to said main shaft and operative to move said latch-lever to non-latching position when said main-shaft has rotated through a selected angle, and means fixed to said second time-lever and holding said first time-lever in its respective unmeshing position when said first time-lever is in its respective meshing position.

5. A taximeter which has a main-shaft, clock-drive mechanism connected to said main-shaft, wheel-drive mechanism connected to said main shaft by a slip-connection which slips when the clock-drive mechanism is faster than said wheel-drive mechanism, a relatively small gear on said main shaft, a relatively large gear meshing with said small gear and angularly adjustably fixed to said driven shaft, said large gear having an angular scale thereon and also having a pin, a drop-arm pivoted to the frame of the taximeter, drop-arm operating means fixed to said main shaft and operative to rock said drop-arm when said drop-arm is in operating position, a control arm connected to said drop-arm, a latch-lever which has a shoulder shaped to releasably retain said control arm in a position in which said drop-arm is in non-operating position, said pin being located to move said latch-lever to release said control arm when said driven shaft has turned through a selected angle, a spring which moves said drop-arm to operating position when said control arm is released, and another spring which biases said latch arm to latching position, said latch-lever having an index for said scale.

6. A taximeter which has a turnable flag shaft, said flag shaft having a "For Hire" position, a movable member which is actuated from a selected position when said flag shaft is turned from said "For Hire" position, said flag shaft having actuating means to actuate said movable member from its selected position and to maintain said movable member out of its selected position when said flag shaft is turned away from said "For Hire" position, first and second indicating drums each of which has digit markings for indicating fare units, the first drum corresponding to lower fare units than the second drum, each drum being fixed to a turnable-drum shaft, each drum-shaft having a spring to bias the respective drum to return to a selected initial position, each said drum shaft having a turnable drum-member mounted loosely on said drum shaft, the shaft of the first drum having a first ratchet wheel and a cam wheel, said cam wheel having a series of peaks which have intermediate recesses fixed thereto, the first ratchet wheel having more teeth than the recesses of the second cam wheel, the shaft of the second drum having a second ratchet wheel fixed thereto, drum-actuating means which include a first pawl and a second pawl which are adapted respectively to engage said first ratchet wheel and said second ratchet wheel and to turn said drums successively in selected respective angular strokes, each said drum-member having a pin which is located to hold the respective pawl in non-operating position when said flag shaft is in said "For Hire" position, said movable member being operatively connected to said drum-members to turn said drum-members when said flag shaft is turned from its "For Hire" position in order to disengage said pins from said pawls so that said pawls then engage said first and second ratchet wheels, said pawls being biased towards said first and second ratchet wheels, and a lever which is turnably connected to the frame of the taximeter, said lever having a first leg and having a second leg, the first leg abutting the cam wheel, the second leg abutting the pawl of the second ratchet wheel to keep said pawl in non-operating position when said first leg abuts a peak of the cam wheel, said second leg releasing the pawl of the second ratchet wheel when said first leg abuts a recess of the cam wheel, said lever being biased towards said cam wheel, whereby the strokes of said second drum are in a selected ratio to the strokes of the first drum.

7. A taximeter according to claim 6, in which said first and second ratchet wheels each have ten teeth, and said cam wheel has five peaks and five recesses, said recesses being located to provide one stroke of the second drum for each two consecutive strokes of the first drum.

8. A taximeter which as a frame which has frame walls, a first mount fixed detachably to said frame, a wheel-driven sleeve connected rotatably to said first mount, said sleeve being rotatable about its longitudinal axis, a shaft which has a longitudinal axis which is coincident with the longitudinal axis of said sleeve, one end of said shaft being located detachably in said sleeve, said sleeve and said shaft having detachable coupling means to rotate them in unison about their common longitudinal axis, worms fixed to said shaft outwardly of said sleeve, a wheel-driven shaft, a gear fixed to said wheel-driven shaft and meshing with one of said worms, a mount for said wheel-driven shaft, said mount being detachably connected to a frame wall and having bearing means for said first-mentioned shaft, and another mount detachably connected to a frame wall and having a train of register-driving gears mounted turnably therein, the gear at one end of said train meshing with the other worm.

9. A taximeter according to claim 8, wherein said frame has longitudinal frame walls, and said mounts are connected to the same longitudinal frame wall.

10. In a taximeter comprising separate sections each of which may be removed without disturbing any other section; the combination of a frame, said frame including longitudinal vertical side walls and a rear wall, said rear wall and one of said side walls being offset inwardly at their meeting portions to provide a right angled recess, clock drive mechanism located in a clock sub-casing which is located in said recess and fixed detachably to the offset portion of said side wall, a main longitudinal clock-shaft which is connected to said clock-driven mechanism to be rotated by said clock-drive mechanism and extending through said side wall portion, a longitudinal driven shaft, a mount for said driven shaft, said mount being connected detachably to a wall of said frame, said driven shaft being alined with said main clock-shaft and having means for releasably coupling said driven shaft to said main clock-shaft, a bevel gear fixed to said driven shaft, an auxiliary driven shaft which has an auxiliary bevel gear which meshes with said first-mentioned bevel gear, respective mounts for said driven shaft and said auxiliary driven shaft, detachable means for fixing said respective mounts separately to said frame, a time fare lever pivoted on said auxiliary driven shaft and turnable relative to said auxiliary driven shaft, said time-fare lever having turnable gear-means mounted thereon, a gear on said auxiliary driven shaft in constant mesh with said gear-means, a main shaft, and a main-shaft gear fixed to said main shaft, said time-fare lever being turnable to respective meshing and unmeshing positions in which its gear-means mesh with and unmesh from said main-shaft gear.

JOSEPH GEORGE WEISINGER.

References Cited in the file of this patent

UNITED STATES PATENTS

| Number | Name | Date |
|---|---|---|
| 1,497,918 | Landsiedel | June 17, 1924 |
| 1,594,186 | Orth | July 27, 1926 |
| 1,744,307 | Gluck | Jan. 21, 1930 |
| 1,762,862 | Gluck | June 10, 1930 |
| 1,771,142 | Riegger | July 22, 1930 |
| 1,827,139 | Brun | Oct. 13, 1931 |
| 1,853,052 | Horton | Apr. 12, 1932 |
| 1,874,962 | Gluck et al. | Aug. 30, 1932 |
| 1,894,384 | Vlahov | Jan. 17, 1935 |
| 2,061,636 | Saunders et al. | Nov. 24, 1936 |
| 2,278,405 | Niemann | Mar. 31, 1942 |
| 2,315,569 | White | Apr. 6, 1943 |
| 2,341,332 | Pirdelko | Feb. 8, 1944 |
| 2,363,811 | Shearston | Nov. 28, 1944 |
| 2,428,080 | Horn | Sept. 30, 1947 |

FOREIGN PATENTS

| Number | Country | Date |
|---|---|---|
| 296,045 | Great Britain | Aug. 24, 1928 |